United States Patent
Lin et al.

(10) Patent No.: US 6,983,018 B1
(45) Date of Patent: Jan. 3, 2006

(54) EFFICIENT MOTION VECTOR CODING FOR VIDEO COMPRESSION

(75) Inventors: Chih-Lung (Bruce) Lin, Redmond, WA (US); Ming-Chieh Lee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 09/201,278

(22) Filed: Nov. 30, 1998

(51) Int. Cl.
*H04N 7/12* (2006.01)

(52) U.S. Cl. .................................. 375/240.16
(58) Field of Classification Search ........... 375/240.16, 375/240.17; 348/699; 382/238, 236, 243
See application file for complete search history.

(56) References Cited

U.S. PATENT DOCUMENTS

| | | |
|---|---|---|
| 4,999,705 A | 3/1991 | Puri |
| 5,117,287 A | 5/1992 | Koike et al. |
| 5,155,594 A | 10/1992 | Bernstein et al. |
| 5,258,836 A | 11/1993 | Murata |
| 5,274,453 A | 12/1993 | Maeda |
| 5,376,971 A | 12/1994 | Kadono et al. |
| 5,379,351 A | 1/1995 | Fandrianto et al. |
| 5,400,075 A | 3/1995 | Savatier |
| 5,428,396 A | 6/1995 | Yagasaki et al. |
| 5,448,297 A | 9/1995 | Alattar et al. |
| 5,457,495 A * | 10/1995 | Hartung ............... 348/414 |
| 5,465,118 A | 11/1995 | Hancock et al. |
| 5,477,272 A | 12/1995 | Zhang et al. |
| 5,517,327 A | 5/1996 | Nakatani et al. |
| 5,546,129 A | 8/1996 | Lee |
| 5,594,504 A | 1/1997 | Ebrahimi |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,654,771 A | 8/1997 | Tekalp et al. |
| 5,668,608 A | 9/1997 | Lee |
| 5,673,339 A | 9/1997 | Lee |
| 5,689,306 A | 11/1997 | Jung |
| 5,692,063 A | 11/1997 | Lee et al. |
| 5,784,175 A | 7/1998 | Lee |
| 5,825,830 A | 10/1998 | Kopf |
| 5,835,144 A | 11/1998 | Matsumura et al. |
| 5,847,776 A | 12/1998 | Khmelnitsky et al. |
| 5,946,043 A | 8/1999 | Lee et al. |
| 5,959,673 A | 9/1999 | Lee et al. |
| 5,970,173 A | 10/1999 | Lee et al. |

(Continued)

FOREIGN PATENT DOCUMENTS

EP 0540350 A2 3/1993

(Continued)

OTHER PUBLICATIONS

"Video Coding for Low Bitrate Communication," Draft Recommendation H.263, International Telecommunication Union, Dec. 1995, 51 pages.

(Continued)

*Primary Examiner*—Vu Le
(74) *Attorney, Agent, or Firm*—Klarquist Sparkman, LLP

(57) ABSTRACT

Video coding efficiency is improved by jointly coding the x and y components of motion vectors with a single variable length code. The motion vector components for a block of pixels are predicted based on motion vectors of neighboring blocks of pixels. The predicted x and y components are then jointly coded by assigning a single variable length code corresponding to the pair of components, rather than a separate code for each component. If the x and y components do not have a corresponding entry in the coding table, they are coded with an escape code followed by fixed length codes.

20 Claims, 4 Drawing Sheets

U.S. PATENT DOCUMENTS

| | | | |
|---|---|---|---|
| 5,982,438 A | 11/1999 | Lin et al. | |
| 6,011,596 A | 1/2000 | Burl et al. | |
| 6,052,150 A | 4/2000 | Kikuchi | |
| 6,111,914 A * | 8/2000 | Bist | 375/240 |

FOREIGN PATENT DOCUMENTS

| | | |
|---|---|---|
| EP | 0535746 A2 | 4/1993 |
| EP | 0614318 A2 | 9/1994 |
| EP | 0625853 A2 | 11/1994 |
| EP | 0625853 A3 | 2/1995 |
| EP | 0614318 A3 | 5/1995 |
| EP | 0825778 A2 | 2/1998 |
| EP | 0830029 A2 | 3/1998 |

OTHER PUBLICATIONS

ISO/IEC FCD 14496-2: Information technology—Very-low bitrate audio-visual coding—Part 2: visual [SC 29/WG 11 N 2202], ISO/IEC JTC 1/SC 29/WG 11, May 28, 1998.

Fogg, "Survey of Software and Hardware VLC Architectures," SPIE vol. 2186, pp. 29-37 (no date of publication).

Gersho et al., *Vector Quantization and Signal Compression*, "Entropy Coding," Chapter 9, pp. 259-305 (1992).

Gibson et al., *Digital Compression of Multimedia*, "Lossless Source Coding," Chapter 2, pp. 17-62 (1998).

Gibson et al., *Digital Compression of Multimedia*, "Universal Lossless Source Coding," Chapter 3, pp. 63-112 (1998).

Gibson et al., *Digital Compression of Multimedia*, "Multimedia Conferencing Standards," Chapter 10, pp. 309-362 (1998).

Gibson et al., *Digital Compression of Multimedia*, "MPEG Compression," Chapter 11, pp. 363-418 (1998).

International Organization for Standardisation ISO/IEC JTCI/SC29/WG11, N2459 "Overview of the MPEG-4 Standards," (Oct. 1998).

ITU-T, "ITU-T Recommendation H.263 Video Coding for Low Bit Rate Communication," (Feb. 1998).

Kunt, Second-Generation Image-Coding Techniques, Proceedings of IEEE, vol. 73, No. 4, pp. 549-574 (Apr. 1995).

Le Gall, "MPEG: A Video Compression Standard for Multimedia Applications," Communications of the ACM, vol. 34, No. 4, pp. 47-58 (Apr. 1991).

Lee et al., "A Layered Video Object Coding System Using Sprite and Affine Motion Model, IEEE Transactions on Circuits and Systems for Video Technology," vol. 7, No. 1, pp. 130-145 (Feb. 1997).

Pennebaker et al., "JPEG Still Image Data Compression Standard," Chapter 20, pp. 325-329, 1993 (no publication date).

IBM Technical Disclosure Bulletin, "Advanced Motion Estimation for Moving Picture Expert Group Encoders," vol. 39, No. 04, pp. 323-324 (Apr. 1996).

ISO, ISO/IEC JTC1/SC29/WG11 MPEG 97/N1642, "MPEG-4 Video Verification Model Version 7.0, 3. Encoder Definition," pp. 1, 17-122, Bristol (Apr. 1997).

Yu et al., "Two-Dimensional Motion Vector Coding for Low Bitrate Videophone Applications," Proc. Int'l Conf. on Image Processing, Los Alamitos, US, pp. 414-417, IEEE Comp. Soc. Press (1995).

* cited by examiner

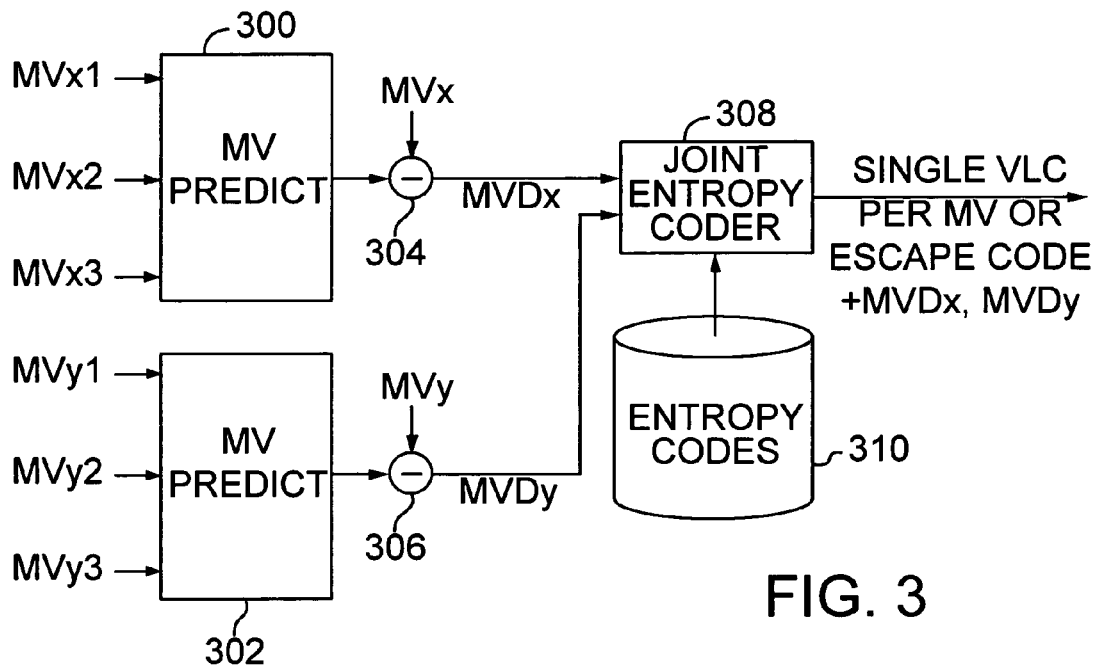
FIG. 3
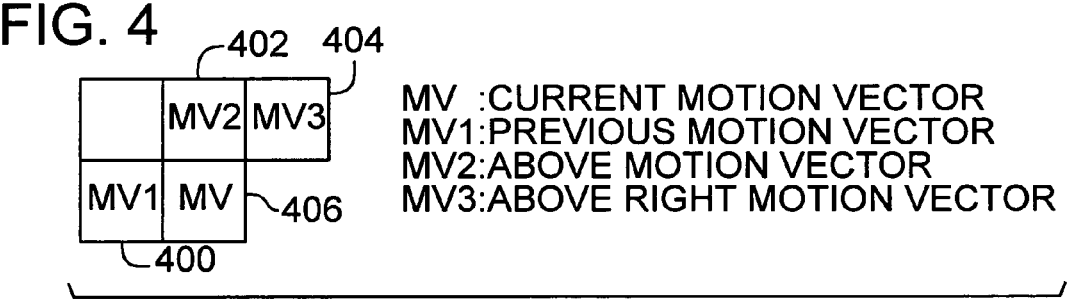
FIG. 4
MV : CURRENT MOTION VECTOR
MV1:PREVIOUS MOTION VECTOR
MV2:ABOVE MOTION VECTOR
MV3:ABOVE RIGHT MOTION VECTOR
FIG. 5
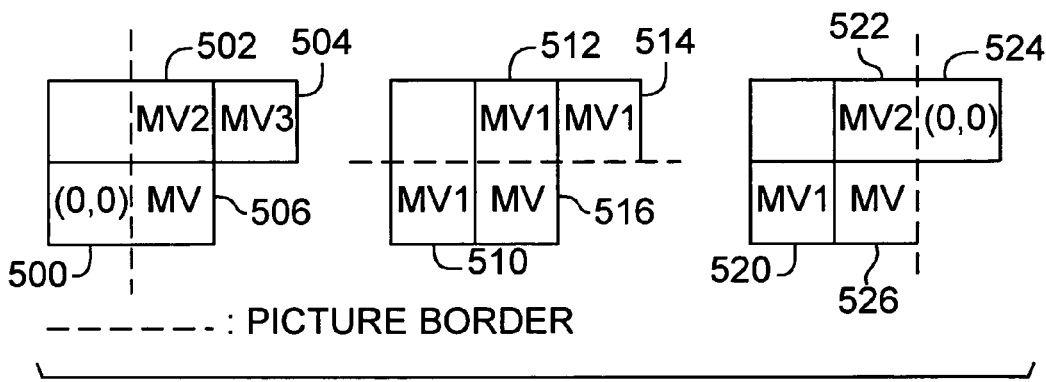
------ : PICTURE BORDER

EFFICIENT MOTION VECTOR CODING FOR VIDEO COMPRESSION

FIELD OF THE INVENTION

The invention relates to video coding, and specifically, to an improved method for coding motion vectors.

BACKGROUND OF THE INVENTION

Full-motion video displays based upon analog video signals have long been available in the form of television. With recent advances in computer processing capabilities and affordability, full-motion video displays based upon digital video signals are becoming more widely available. Digital video systems can provide significant improvements over conventional analog video systems in creating, modifying, transmitting, storing, and playing full-motion video sequences.

Digital video displays include large numbers of image frames that are played or rendered successively at frequencies of between 30 and 75 Hz. Each image frame is a still image formed from an array of pixels based on the display resolution of a particular system. As examples, VHS-based systems have display resolutions of 320×480 pixels, NTSC-based systems have display resolutions of 720×486 pixels, and high-definition television (HDTV) systems under development have display resolutions of 1360×1024 pixels.

The amounts of raw digital information included in video sequences are massive. Storage and transmission of these amounts of video information is infeasible with conventional personal computer equipment. Consider, for example, a digitized form of a relatively low resolution VHS image format having a 320×480 pixel resolution. A full-length motion picture of two hours in duration at this resolution corresponds to 100 gigabytes of digital video information. By comparison, conventional compact optical disks have capacities of about 0.6 gigabytes, magnetic hard disks have capacities of 1–2 gigabytes, and compact optical disks under development have capacities of up to 8 gigabytes.

To address the limitations in storing or transmitting such massive amounts of digital video information, various video compression standards or processes have been established, including MPEG-1, MPEG-2, and H.26X. These video compression techniques utilize similarities between successive image frames, referred to as temporal or interframe correlation, to provide interframe compression in which motion data and error signals are used to encode changes between frames.

In addition, the conventional video compression techniques utilize similarities within image frames, referred to as spatial or intraframe correlation, to provide intraframe compression in which the image samples within an image frame are compressed. Intraframe compression is based upon conventional processes for compressing still images, such as discrete cosine transform (DCT) encoding. This type of coding is sometimes referred to as "texture" or "transform" coding. A "texture" generally refers to a two-dimensional array of image sample values, such as an array of chrominance and luminance values or an array of alpha (opacity) values. The term "transform" in this context refers to how the image samples are transformed into spatial frequency components during the coding process. This use of the term "transform" should be distinguished from a geometric transform used to estimate scene changes in some interframe compression methods.

Interframe compression typically utilizes motion estimation and compensation to encode scene changes between frames. Motion estimation is a process for estimating the motion of image samples (e.g., pixels) between frames. Using motion estimation, the encoder attempts to match blocks of pixels in one frame with corresponding pixels in another frame. After the most similar block is found in a given search area, the change in position of the pixel locations of the corresponding pixels is approximated and represented as motion data, such as a motion vector. Motion compensation is a process for determining a predicted image and computing the error between the predicted image and the original image. Using motion compensation, the encoder applies the motion data to an image and computes a predicted image. The difference between the predicted image and the input image is called the error signal. Since the error signal is just an array of values representing the difference between image sample values, it can be compressed using the same texture coding method as used for intraframe coding of image samples.

Although differing in specific implementations, the MPEG-1, MPEG-2, and H.26X video compression standards are similar in a number of respects. The following description of the MPEG-2 video compression standard is generally applicable to the others.

MPEG-2 provides interframe compression and intraframe compression based upon square blocks or arrays of pixels in video images. A video image is divided into image sample blocks called macroblocks having dimensions of 16×16 pixels. In MPEG-2, a macroblock comprises four luminance blocks (each block is 8×8 samples of luminance (Y)) and two chrominance blocks (one 8×8 sample block each for Cb and Cr).

In MPEG-2, interframe coding is performed on macroblocks. An MPEG-2 encoder performs motion estimation and compensation to compute motion vectors and block error signals. For each block MN in an image frame N, a search is performed across the image of a next successive video frame N+1 or immediately preceding image frame N−1 (i.e., bi-directionally) to identify the most similar respective blocks $M_{N+1}$ or $M_{N-1}$. The location of the most similar block relative to the block MN is encoded with a motion vector (DX,DY). The motion vector is then used to compute a block of predicted sample values. These predicted sample values are compared with block MN to determine the block error signal. The error signal is compressed using a texture coding method such as discrete cosine transform (DCT) encoding.

Object-based video coding techniques have been proposed as an improvement to the conventional frame-based coding standards. In object-based coding, arbitrary shaped image features are separated from the frames in the video sequence using a method called "segmentation." The video objects or "segments" are coded independently. Object-based coding can improve the compression rate because it increases the interframe correlation between video objects in successive frames. It is also advantageous for variety of applications that require access to and tracking of objects in a video sequence.

In the object-based video coding methods proposed for the MPEG-4 standard, the shape, motion and texture of video objects are coded independently. The shape of an object is represented by a binary or alpha mask that defines the boundary of the arbitrary shaped object in a video frame. The motion of an object is similar to the motion data of MPEG-2, except that it applies to an arbitrary-shaped image of the object that has been segmented from a rectangular frame. Motion estimation and compensation is performed on blocks of a "video object plane" rather than the entire frame. The video object plane is the name for the shaped image of an object in a single frame.

The texture of a video object is the image sample information in a video object plane that falls within the object's shape. Texture coding of an object's image samples and error signals is performed using similar texture coding methods as in frame-based coding. For example, a segmented image can be fitted into a bounding rectangle formed of macroblocks. The rectangular image formed by the bounding rectangle can be compressed just like a rectangular frame, except that transparent macroblocks need not be coded. Partially transparent blocks are coded after filling in the portions of the block that fall outside the object's shape boundary with sample values in a technique called "padding."

In both frame-based and object-based video coding, the encoded bit stream typically includes many interframe-coded frames (P frames). Each of these P frames includes at least one motion vector per macroblock, and each motion vector includes X and Y components that coded independently. As such, motion vectors contribute a significant amount of data for each coded P frame. There is a need, therefore, for more efficient motion vector coding schemes.

SUMMARY OF THE INVENTION

The invention provides an improved method of coding motion vectors for video coding applications. One aspect of the invention is a method for jointly coding a motion vector with a single entropy code. This method is based on the discovery that the probability of the X and Y components of the motion vector are not totally independent. To exploit the correlation between the motion vector components, the method uses entropy coding to assign a single variable length code to a joint parameter representing the combined X and Y components of the motion vector. Motion vector component pairs that are more likely are assigned a shorter length code, while less likely component pairs are assigned a longer length code or are coded with an escape code followed by a code for each component. This approach can be used in a variety of video coding applications, including both object-based and frame based coding. In addition, joint entropy coding of motion vectors can be used in combination with spatial prediction to code motion vectors more efficiently.

For example, in one implementation, an encoder first computes a predictor for the motion vector, and then computes differential X and Y components from the X and Y components of the vector currently being processed and its predictor. A joint entropy coder then computes a single variable length code for a joint parameter representing both the X and Y differential components.

The decoder performs the inverse of the encoder operations to reconstruct the motion vector from the variable length code. In particular, it computes the joint parameter from the variable length code, and then reconstructs the motion vector from the differential components and the components of the predictor.

Additional features of the invention will become more apparent from the following detailed description and accompanying drawings.

BRIEF DESCRIPTION OF THE DRAWINGS

FIG. 3 is a block diagram illustrating how an implementation of the invention jointly codes motion vector components for a macroblock with a single entropy code.

FIG. 4 is a diagram illustrating how a predictor for the motion vector of a current block is selected from motion vectors of neighboring macroblocks.

FIG. 5 is a diagram illustrating how a motion vector predictor is selected in cases where one or more neighboring macroblocks are outside the picture.

DETAILED DESCRIPTION

Introduction

The first section below provides a description of a video encoder and decoder. Subsequent sections describe how to improve coding of motion vectors by exploiting the correlation between the X and Y components of the vectors.

This approach for jointly coding the X and Y components of a motion vector applies to both frame-based and object-based video coding. Both forms of video coding employ motion vectors to define the motion of a pixel or block of pixels from one frame to another. Typically, a motion vector is computed for regular sized blocks of pixels. In frame-based coding, the frame is divided into regular sized blocks. In object-based coding, each video object plane is divided into blocks. Since the object represented in a video object plane usually has a non-rectangular shape, object-based coders use the shape to determine which pixels in each block fall within the boundaries of the object. While frame-based and object-based coding differ in this respect, both approaches use motion vectors that define the motion of pixels in a block. Thus, the correlation between the X and Y components of motion vectors in both types of coders can be exploited to improve coding efficiency.

While the encoder and decoder described in the next section are object-based, they provide a sufficient basis for explaining how to implement the invention in both frame-based and object-based coding schemes.

Description of an Example Encoder and Decoder

Figure 1:
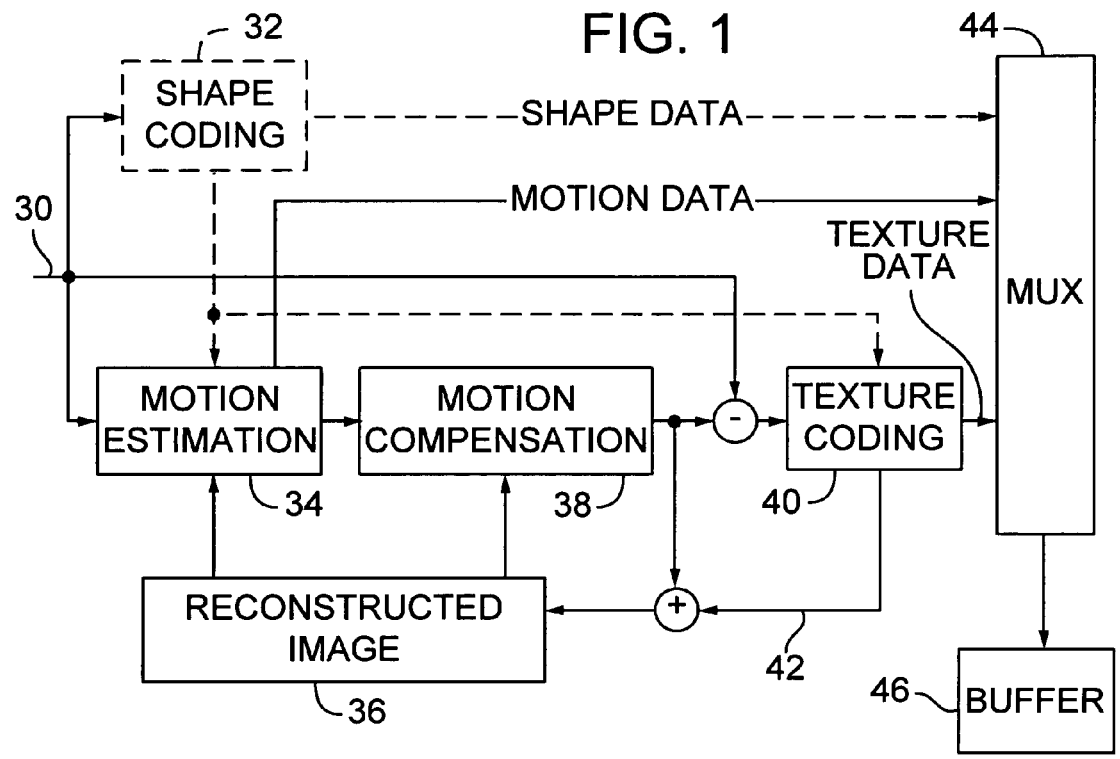
FIG. 1 is a block diagram of a video coder.

FIG. 1 is a block diagram illustrating an implementation of an object-based video encoder. The input 30 to the encoder includes images representing the video objects in each frame, the shape of each video object and bounding rectangles. The shape information is available before the encoder codes texture or motion data. Frame-based coding differs in that the entire frame is coded without shape information, and the input 30 consists of a series of image frames.

The shape coding module 32 reads the definition of an object including its bounding rectangle and extends the bounding rectangle to integer multiples of macroblocks. The shape information for an object comprises a mask or "alpha plane." The shape coding module 32 reads this mask and compresses it, using for example, a conventional chain coding method to encode the contour of the object.

Motion estimation module 34 reads an object including its bounding rectangle and a previously reconstructed image 36 and computes motion estimation data used to predict the motion of an object from one frame to another. The motion estimation module 34 searches for the most similar macroblock in the reconstructed image for each macroblock in the current image to compute a motion vector for each macroblock. The specific format of the motion vector from the motion estimation module 34 can vary depending on the motion estimation method used. In the implementation described below, there is a motion vector for each macroblock, which is consistent with current MPEG and H26X formats.

The motion compensation module 38 reads the motion vectors computed by the motion estimation module and the previously reconstructed image 36 and computes a predicted image for the current frame. Each pixel in the predicted image is constructed by using the motion vector for the macroblock that it resides in to find the corresponding pixel in the previously reconstructed image 36. The encoder then finds the difference between the image sample values in the input image block as specified in the input 30 and the corresponding sample values in the predicted image block as computed in the motion compensation module 38 to determine the error signal for the macroblock.

Texture coding module 40 compresses this error signal for inter-frame coded objects and compresses image sample values for the object from the input data stream for intra-frame coded objects. The feedback path 42 from the texture coding module 40 represents the error signal. The encoder uses the error signal blocks along with the predicted image blocks from the motion compensation module to compute the previously reconstructed image 36.

The texture coding module 40 codes intra-frame and error signal data for an object using any of a variety of still image compression techniques. Example compression techniques include DCT, wavelet, as well as other conventional image compression methods.

The bit stream of the compressed video sequence includes the shape, motion and texture coded information from the shape coding, motion estimation, and texture coding modules. Multiplexer 44 combines and formats this data into the proper syntax and outputs it to the buffer 46. As explained in more detail below, the encoder also includes a motion vector encoder that uses entropy coding to jointly code the x and y components of the motion vector for each macroblock. The motion vector encoder may be implemented as part of the motion estimation module 34 or as part of the data formatting functions in the multiplexer 44.

While the encoder can be implemented in hardware or software, it is most likely implemented in software. In a software implementation, the modules in the encoder represent software instructions stored in memory of a computer and executed in the processor, and the video data stored in memory. A software encoder can be stored and distributed on a variety of conventional computer readable media. In hardware implementations, the encoder modules are implemented in digital logic, preferably in an integrated circuit. Some of the encoder functions can be optimized in special-purpose digital logic devices in a computer peripheral to off-load the processing burden from a host computer.

Figure 2:
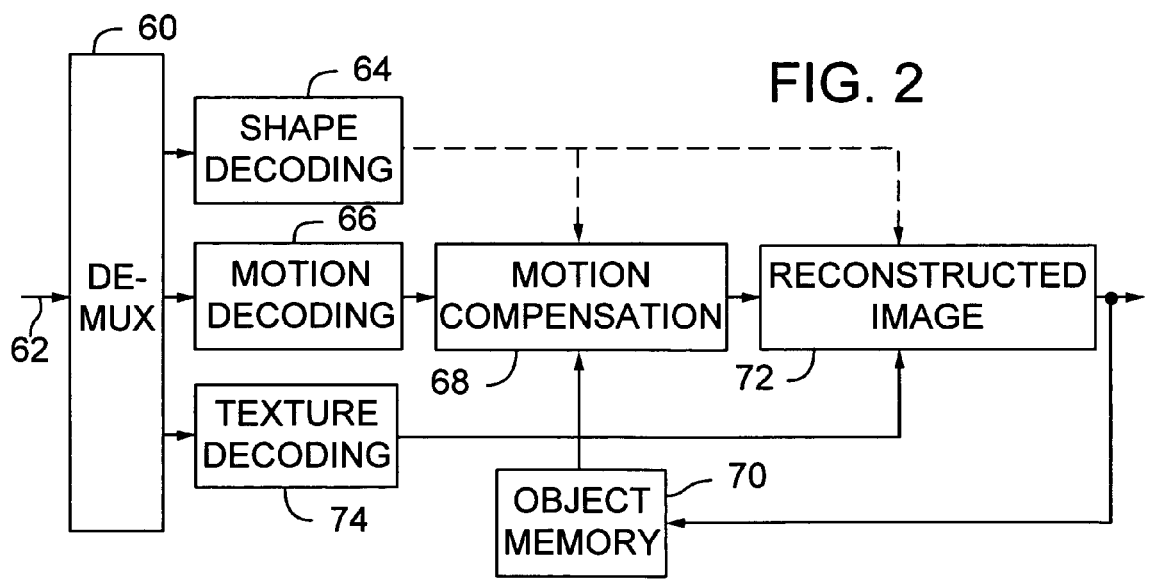
FIG. 2 is a block diagram of a video decoder.

FIG. 2 is a block diagram illustrating a decoder for an object-based video coding method. A demultiplexer 60 receives a bit stream representing a compressed video sequence and separates shapes, motion and texture encoded data on an object by object basis. The demultiplexer also includes a motion vector decoder that reconstructs the motion vector for each macroblock from a single variable length code.

Shape decoding module 64 decodes the shape or contour for the current object being processed. To accomplish this, it employs a shape decoder that implements the inverse of the shape encoding method used in the encoder of FIG. 1. The resulting shape data is a mask, such as a binary alpha plane or gray scale alpha plane representing the shape of the object.

The motion decoding module 66 decodes the motion information in the bit stream. The decoded motion information includes the motion vectors for each macroblock that are reconstructed from entropy codes in the incoming bit-stream. The motion decoding module 66 provides this motion information to the motion compensation module 68, and the motion compensation module 68 uses the motion vectors to find predicted image samples in the previously reconstructed object data 70.

The texture decoding module 74 decodes error signals for inter-frame coded texture data and an array of color values for intra-frame texture data and passes this information to a module 72 for computing and accumulating the reconstructed image. For inter-frame coded objects, this module 72 applies the error signal data to the predicted image output from the motion compensation module to compute the reconstructed object for the current frame. For intra-frame coded objects the texture decoding module 74 decodes the image sample values for the object and places the reconstructed object in the reconstructed object module 72. Previously reconstructed objects are temporarily stored in object memory 70 and are used to construct the object for other frames.

Like the encoder, the decoder can be implemented in hardware, software or a combination of both. In software implementations, the modules in the decoder are software instructions stored in memory of a computer and executed by the processor, and video data stored in memory. A software decoder can be stored and distributed on a variety of conventional computer readable media. In hardware implementations, the decoder modules are implemented in digital logic, preferably in an integrated circuit. Some of the decoder functions can be optimized in special-purpose digital logic devices in a computer peripheral to off-load the processing burden from a host computer.

Improved Coding of Motion Vectors

The coding efficiency of motion vectors can be improved by exploiting the correlation between the X and Y components of a motion vector. Traditional coding methods code the X and Y components separately based on the premise that the probability distribution of the X and Y components are independent. We have discovered that the X and Y components are not totally independent, but instead, have a correlation.

To take advantage of this correlation, an implementation of the invention assigns a single entropy code to the joint X and Y components of a motion vector. Before coding, sample video data for a target bit rate and content scenario is used to generate a codebook. This codebook assigns a single variable length code to pairs of X and Y components based on their frequency of occurrence. More frequent, and therefore statistically more probable pairs, are assigned shorter length codes, while less frequent pairs are assigned longer length codes. A statistical analysis program computes the probability of each of the joint X and Y components by extracting the motion vector data generated from an encoder for several example video sequences that have the desired type of content. The program creates a probability distribution for pairs of motion vectors (namely, differential motion vectors) and then assigns codes to a subset of the motion vectors that are most probable.

To limit the size of the codebook, low probability pairs need not be assigned a code. Instead, these pairs can be coded by using an escape code to indicate that the motion vector components follow in fix length bit fields. Pairs are excluded from the codebook based on where they fall in the probability distribution.

While not required, the coding of motion vectors can be improved by using a differential coding process that takes advantage of the spatial dependency of motion vectors. In particular, a motion vector for a small block of pixels is likely to point in a similar direction as the motion vector for a neighboring block, especially if both the current block and its neighbor are in a region of the frame having nearly uniform motion. One way to take advantage of this spatial dependency is to code the difference between a motion vector for the current block and the motion vector for a neighboring block, called the predictor. The implementation uses a form of spatial prediction to encode the X and Y components before assigning a joint entropy code.

FIG. 3 is a block diagram illustrating how our implementation encodes motion vectors. The features shown in FIG. 3 are implemented in the encoder and operate on the motion vectors computed in the motion estimation block 34. First, the motion estimation block computes a motion vector for each macroblock in the frame. When a frame consists of more than one video object plane, the motion estimation block computes motion vectors for the macroblocks of each video object plane.

The encoder begins coding the motion vector for each macroblock by computing a predictor for the current motion vector. The implementation shown in FIG. 3 selects a predictor from among neighboring macroblocks. FIG. 4 shows an example of the positioning of the candidates for the predictor relative to the current macroblock for which the motion vector is being encoded. In this example, the candidate macroblocks include the ones to the left 400, above 402, and above-right 404 relative to the current macroblock 406. The motion vectors for the candidate macroblocks are referred to as MV1, MV2, and MV3, respectively.

As shown in FIG. 3, the encoder computes the predictor separately for the X and Y components of the current macroblock. In particular, the motion vector predictors 300, 302 compute the median of the X and Y components for the candidate macroblocks. The median of these three values is chosen as the predictor for the X and Y components. The precise method of computing the predictor is not critical to the invention and other ways of selecting a predictor are possible. One alternative is to select a neighboring block located in the direction of the lowest gradient of the neighboring motion vectors. Another alternative is to compute an average of motion vectors of neighboring blocks.

Once the motion vector predictor selects the predictor, the encoder computes differential motion vector components. For each X and Y component, the encoder computes the difference between the component of the current motion vector and the corresponding component of the predictor. As reflected by subtractor units 304, 306 in FIG. 3, the X component of the predictor is subtracted from the X component of the current vector MVx, and the Y component of the predictor is subtracted from the Y component of the current vector MVy.

The resulting differential X and Y components (MVDx and MVDy) are then formed into a joint parameter that is coded with a single variable length code, or an escape code followed by fixed code word for each differential component. The implementation uses a joint Huffman coding table that is trained for a target bit rate and video content. The joint entropy coder 308 looks up the joint parameter in the table to find a corresponding variable length code. If the coder finds a match in the table, it codes the joint parameter with a single variable length code. Otherwise, it codes an escape code followed by a fixed length code word for each component.

The entropy codes 310 shown in FIG. 3 refer to the Huffman coding table. An example of a Huffman coding table trained for low bit rate, talking head applications is set forth at the end of this section in Table 1. Following Table 1, Table 2 is an example of a Huffman table trained for more general video applications. While our implementation uses Huffman coding tables, the entropy codes can be computed using other forms of entropy coding such as arithmetic coding.

Since the predictor is selected from motion vectors of neighboring blocks of pixels, the encoder applies special rules to address the situation where one or more neighboring blocks are outside the picture. FIG. 5 illustrates cases where a neighboring block is outside the picture and shows the motion vectors that are used to predict the motion vector in the current macroblock.

If one neighboring block is outside the picture (e.g., block 500 in FIG. 5), a zero motion vector (0,0) is used in its place. The predictor of the current macroblock 506 is computed as the median of the zero motion vector, and motion vectors MV2 and MV3 for the other two neighboring macroblocks 502, 504. As another example, the configuration on the far right of FIG. 5 shows the case where the above-right macroblock 524 is out of the picture. In this case, MV1 and MV2 for the other two macroblocks 520, 522 inside the picture are used along with the zero motion vector for the third macroblock 524 to predict the motion vector for the current macroblock 526.

If two candidate macroblocks 512, 514 are out of the picture (as shown in the middle diagram of FIG. 5), then the motion vector for the third neighboring macroblock 510 is selected as the predictor for the current macroblock 516.

Figure 6:
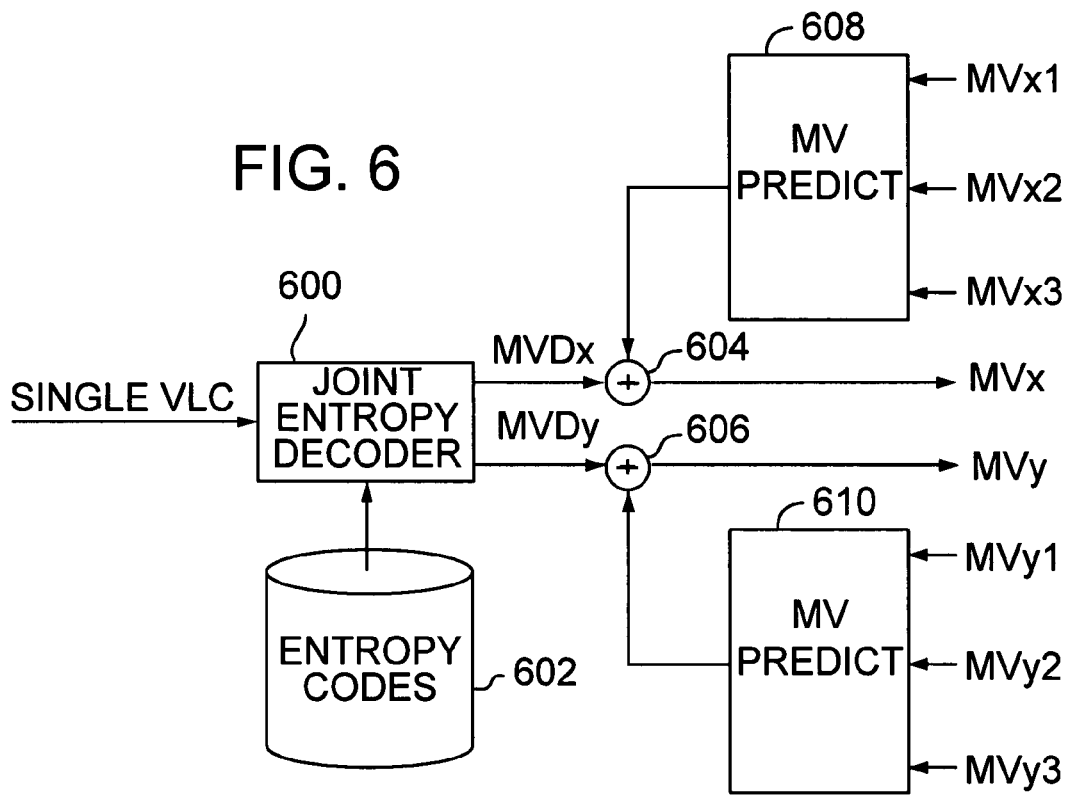
FIG. 6 is a block diagram illustrating how an implementation of the invention decodes a jointly coded motion vector.

FIG. 6 is a diagram illustrating an implementation of a decoder for decoding a single variable length code representing joint motion vector components into X and Y motion vector components. The joint entropy decoder 600 reads the variable length code as input and finds the corresponding differential X and Y components in the entropy codes 602. In the current implementation, the entry codes are in the form of a Huffman table (e.g., tables 1 or 2 listed below). As noted above, the encoder can also use an alternative entropy coding scheme, in which case, the decoder would have the appropriate codebook to correspond with the codebook used in the encoder.

In some cases, the motion vector may be coded with an escape code followed by two fixed length codes representing the differential motion vector components. In this case, the joint entropy decoder 600 recognizes the escape code and interprets the following data as differential motion vectors instead of a variable length code. It then passes the differential X and Y components to the next stage.

Next, the decoder forms the motion vector from the differential motion vector components MVDx, MVDy and the X and Y components of the predictor. In particular the decoder adds each differential motion vector component MVDx, MVDy and the X and Y components of the predictor (see adders 604, 606, FIG. 6). The decoder computes the predictor components in the same way as the encoder. In particular, it has a motion vector predictor that computes the predictor of the motion vectors previously decoded for the three neighboring macroblocks (MVx1, MVy), (MVx2, MVy2) and (MVx3, MVy3). In the implementation, the motion vector predictor blocks 608, and 610 represent the computation of the median of the X and Y components, respectively, of the neighboring macroblocks. As noted above, other ways of computing the predictor are possible. Regardless of the specific form of prediction, the decoder performs inverse prediction according to the prediction scheme used in the encoder.

Once the motion vector for the current macroblock (MVx, MVy) is reconstructed, it is stored and used to decode the motion vector for neighboring macroblocks according to the prediction scheme.

The following tables provide examples of Huffman coding tables trained for talking head video (Table 1) and more general video content (Table 2).

TABLE 1

XY Joint VLC Motion Vector Table for Talking Head Video

| Index | Mv_x | Mv_y | Number of bits | Code |
|---|---|---|---|---|
| 0 | 0 | 0 | 1 | 1 |
| 1 | 0 | −0.5 | 4 | 0011 |
| 2 | −0.5 | 0 | 4 | 0101 |
| 3 | 0 | 0.5 | 4 | 0111 |
| 4 | 0.5 | 0 | 5 | 00010 |
| 5 | −0.5 | −0.5 | 5 | 01000 |
| 6 | 0.5 | −0.5 | 5 | 01101 |
| 7 | −0.5 | 0.5 | 6 | 000000 |
| 8 | 0.5 | 0.5 | 6 | 000001 |
| 9 | 0 | 1 | 6 | 011001 |
| 10 | 1 | 0 | 7 | 0000101 |
| 11 | 0 | −1 | 7 | 0001111 |
| 12 | −1 | 0 | 7 | 0010110 |
| 13 | 0 | 1.5 | 8 | 00001001 |
| 14 | −0.5 | 1 | 8 | 00001101 |
| 15 | 1 | −0.5 | 8 | 00001110 |
| 16 | 1.5 | 0 | 8 | 00011011 |
| 17 | 0 | −1.5 | 8 | 00011101 |
| 18 | 1 | 0.5 | 8 | 00100001 |
| 19 | 0.5 | −1 | 8 | 00100110 |
| 20 | −1.5 | 0 | 8 | 00101000 |
| 21 | 0.5 | 1 | 8 | 00101010 |
| 22 | −1 | 0.5 | 8 | 00101110 |
| 23 | −1 | −0.5 | 8 | 01001100 |
| 24 | −0.5 | −1 | 8 | 01001101 |
| 25 | −0.5 | 1.5 | 9 | 000010001 |
| 26 | 1.5 | −0.5 | 9 | 000110000 |
| 27 | −1.5 | −0.5 | 9 | 000110001 |
| 28 | 0.5 | −1.5 | 9 | 000110011 |
| 29 | 1.5 | 0.5 | 9 | 000110101 |
| 30 | 0.5 | 1.5 | 9 | 001000000 |
| 31 | 1 | −1 | 9 | 001001010 |
| 32 | −0.5 | −1.5 | 9 | 001001011 |
| 33 | −1.5 | 0.5 | 9 | 001010010 |
| 34 | −1 | 1 | 9 | 001011110 |
| 35 | 1 | 1 | 9 | 010010010 |
| 36 | −1 | −1 | 9 | 011000000 |
| 37 | 2 | 0 | 10 | 0000110011 |
| 38 | −2 | 0 | 10 | 0000111111 |
| 39 | 0 | 2 | 10 | 0001101000 |
| 40 | 1 | −1.5 | 10 | 0001110000 |
| 41 | 2.5 | 0 | 10 | 0001110001 |
| 42 | −1 | 1.5 | 10 | 0010010000 |
| 43 | −2.5 | 0 | 10 | 0010011100 |
| 44 | 0 | −2 | 10 | 0010011101 |
| 45 | −3.5 | 0 | 10 | 0010011111 |
| 46 | 3.5 | 0 | 10 | 0010101100 |
| 47 | 0 | −2.5 | 10 | 0010101101 |
| 48 | 1 | 1.5 | 10 | 0100100010 |
| 49 | 0 | 2.5 | 10 | 0100100011 |
| 50 | 1.5 | 1 | 10 | 0100101000 |
| 51 | 1.5 | −1.5 | 10 | 0100111001 |
| 52 | 1.5 | −1 | 10 | 0100111011 |
| 53 | −0.5 | 2 | 10 | 0110000011 |
| 54 | 1.5 | 1.5 | 10 | 0110000101 |

TABLE 1-continued

XY Joint VLC Motion Vector Table for Talking Head Video

| Index | Mv_x | Mv_y | Number of bits | Code |
|---|---|---|---|---|
| 55 | −1.5 | 1 | 10 | 0110000110 |
| 56 | 0 | −3.5 | 10 | 0110001000 |
| 57 | −1.5 | −1 | 10 | 0110001001 |
| 58 | −1 | −1.5 | 10 | 0110001111 |
| 59 | −1.5 | 1.5 | 11 | 00001000001 |
| 60 | 2.5 | 0.5 | 11 | 00001100001 |
| 61 | −2.5 | −0.5 | 11 | 00001100010 |
| 62 | 2 | −0.5 | 11 | 00001111101 |
| 63 | 3 | 0 | 11 | 00011001000 |
| 64 | 2.5 | −0.5 | 11 | 00011010011 |
| 65 | 0.5 | −2 | 11 | 00011100100 |
| 66 | 0 | 3.5 | 11 | 00011100111 |
| 67 | −0.5 | −2 | 11 | 00100000100 |
| 68 | −1.5 | −1.5 | 11 | 00100000101 |
| 69 | −0.5 | 2.5 | 11 | 00100100100 |
| 70 | −2 | −0.5 | 11 | 00100100101 |
| 71 | 2 | 0.5 | 11 | 00100111100 |
| 72 | 0.5 | −2.5 | 11 | 00100111101 |
| 73 | −1 | 2 | 11 | 00101001111 |
| 74 | 1 | −2 | 11 | 00101111100 |
| 75 | 0.5 | 2 | 11 | 00101111101 |
| 76 | 0.5 | 2.5 | 11 | 00101111110 |
| 77 | −2 | 0.5 | 11 | 01001000000 |
| 78 | −2.5 | 0.5 | 11 | 01001001100 |
| 79 | −3.5 | −0.5 | 11 | 01001001111 |
| 80 | −0.5 | −2.5 | 11 | 01001010110 |
| 81 | −3 | 0 | 11 | 01001011100 |
| 82 | 3.5 | −0.5 | 11 | 01001110001 |
| 83 | 0 | 3 | 11 | 01001110100 |
| 84 | 0 | −3 | 11 | 01100010110 |
| 85 | −0.5 | −3.5 | 11 | 01100010111 |
| 86 | 0.5 | −3.5 | 11 | 01100011001 |
| 87 | 3.5 | 0.5 | 11 | 01100011100 |
| 88 | −0.5 | 3.5 | 12 | 000010000100 |
| 89 | 3 | −0.5 | 12 | 000010000101 |
| 90 | −2 | 1 | 12 | 000010000111 |
| 91 | 2 | −1 | 12 | 000011001000 |
| 92 | −5.5 | 0 | 12 | 000011001001 |
| 93 | −4.5 | 0 | 12 | 000011001010 |
| 94 | 5.5 | 0 | 12 | 000011001011 |
| 95 | 2 | 1 | 12 | 000011110001 |
| 96 | 1 | 2 | 12 | 000011110010 |
| 97 | 4.5 | 0 | 12 | 000011111000 |
| 98 | −1 | −2 | 12 | 000110010101 |
| 99 | −3.5 | 0.5 | 12 | 000110100101 |
| 100 | −2 | −1 | 12 | 000111001101 |
| 101 | −0.5 | 3 | 12 | 001000001101 |
| 102 | −1 | 2.5 | 12 | 001001000111 |
| 103 | 1 | −2.5 | 12 | 001001001101 |
| 104 | 3 | 0.5 | 12 | 001010011101 |
| 105 | 1.5 | −2 | 12 | 001010111000 |
| 106 | 14.5 | 0 | 12 | 001010111110 |
| 107 | 1 | 2.5 | 12 | 010010011010 |
| 108 | −2 | 1.5 | 12 | 010010011100 |
| 109 | −1 | 3 | 12 | 010010100111 |
| 110 | 2.5 | −1.5 | 12 | 010010101000 |
| 111 | 2.5 | 1 | 12 | 010010101011 |
| 112 | 1.5 | −2.5 | 12 | 010010101110 |
| 113 | −2.5 | −1.5 | 12 | 010010101111 |
| 114 | 2 | −1.5 | 12 | 010010110101 |
| 115 | −14.5 | 0 | 12 | 010010110110 |
| 116 | 13.5 | 0 | 12 | 010010110111 |
| 117 | 3 | 1 | 12 | 010010111100 |
| 118 | 2.5 | 1.5 | 12 | 010010111110 |
| 119 | 0 | −14.5 | 12 | 010010111111 |
| 120 | −0.5 | −3 | 12 | 010011100001 |
| 121 | −1.5 | 2 | 12 | 010011111100 |
| 122 | −3 | −0.5 | 12 | 010011111101 |
| 123 | 0.5 | 3 | 12 | 010011111111 |
| 124 | 2.5 | −1 | 12 | 011000001000 |
| 125 | 0.5 | −3 | 12 | 011000001001 |
| 126 | −2.5 | 1.5 | 12 | 011000001010 |
| 127 | −2.5 | 1 | 12 | 011000001011 |
| 128 | 1.5 | 2.5 | 12 | 011000010000 |
| 129 | 1 | −3 | 12 | 011000011100 |

TABLE 1-continued

XY Joint VLC Motion Vector Table for Talking Head Video

| Index | Mv_x | Mv_y | Number of bits | Code |
|---|---|---|---|---|
| 130 | 1 | −3.5 | 12 | 011000011110 |
| 131 | 4 | 0 | 12 | 011000011111 |
| 132 | 5 | 0 | 12 | 011000101010 |
| 133 | 0.5 | 3.5 | 12 | 011000101011 |
| 134 | 0 | −4.5 | 12 | 011000110000 |
| 135 | −1.5 | 2.5 | 12 | 011000110111 |
| 136 | −14 | 0 | 12 | 011000111010 |
| 137 | −13.5 | 0 | 13 | 0000100000000 |
| 138 | −2 | −1.5 | 13 | 0000100000001 |
| 139 | −4 | 0 | 13 | 0000100001100 |
| 140 | −3.5 | −1.5 | 13 | 0000110000011 |
| 141 | 1.5 | 2 | 13 | 0000110001110 |
| 142 | 3.5 | −1.5 | 13 | 0000111100000 |
| 143 | 3 | −1 | 13 | 0000111100001 |
| 144 | 0 | 4.5 | 13 | 0000111101111 |
| 145 | −4.5 | −0.5 | 13 | 0000111110010 |
| 146 | −2.5 | −1 | 13 | 0000111110011 |
| 147 | 0 | −5.5 | 13 | 0001100100101 |
| 148 | −1 | 3.5 | 13 | 0001100100110 |
| 149 | 1.5 | −3.5 | 13 | 0001100100111 |
| 150 | −3 | 1 | 13 | 0001100101000 |
| 151 | 1 | 3 | 13 | 0001100101001 |
| 152 | 14 | 0 | 13 | 0001101001001 |
| 153 | 2 | 1.5 | 13 | 0001110010100 |
| 154 | −1.5 | 3.5 | 13 | 0001110010101 |
| 155 | −5 | 0 | 13 | 0001110011001 |
| 156 | −3 | 0.5 | 13 | 0010000011000 |
| 157 | 4.5 | 0.5 | 13 | 0010010011000 |
| 158 | −12.5 | 0 | 13 | 0010010011001 |
| 159 | −1 | −2.5 | 13 | 0010010011100 |
| 160 | 3 | −1.5 | 13 | 0010010011110 |
| 161 | −1 | −3.5 | 13 | 0010010011111 |
| 162 | 2 | −2 | 13 | 0010100110000 |
| 163 | −1.5 | −2.5 | 13 | 0010100110010 |
| 164 | −1 | −3 | 13 | 0010101110011 |
| 165 | 4.5 | −0.5 | 13 | 0010101110100 |
| 166 | −3 | −1 | 13 | 0010101110101 |
| 167 | −3.5 | 1.5 | 13 | 0010101111011 |
| 168 | 0 | −4 | 13 | 0010101111111 |
| 169 | 1 | −4 | 13 | 0010111111100 |
| 170 | −4 | −0.5 | 13 | 0100100001111 |
| 171 | 3.5 | 1 | 13 | 0100100110110 |
| 172 | −15.5 | 0 | 13 | 0100101001010 |
| 173 | −3.5 | −1 | 13 | 0100101001011 |
| 174 | 3.5 | 1.5 | 13 | 0100101001100 |
| 175 | 0 | 4 | 13 | 0100101010010 |
| 176 | −2 | −2 | 13 | 0100101010011 |
| 177 | −1.5 | 3 | 13 | 0100101010100 |
| 178 | 0 | −13.5 | 13 | 0100101010101 |
| 179 | 3 | 1.5 | 13 | 0100101101000 |
| 180 | −3 | −1.5 | 13 | 0100101101001 |
| 181 | 2 | 2 | 13 | 0100101110101 |
| 182 | −2 | 2 | 13 | 0100101110110 |
| 183 | 15.5 | 0 | 13 | 0100101110111 |
| 184 | −2 | 3 | 13 | 0100101111011 |
| 185 | 3.5 | −1 | 13 | 0100111000000 |
| 186 | −4.5 | 0.5 | 13 | 0100111000001 |
| 187 | −5.5 | −0.5 | 13 | 0100111110110 |
| 188 | −3 | 1.5 | 13 | 0100111110111 |
| 189 | 1.5 | −3 | 13 | 0100111111100 |
| 190 | −0.5 | −4.5 | 13 | 0100111111101 |
| 191 | 1.5 | 3 | 13 | 0110000100110 |
| 192 | 12.5 | 0 | 13 | 0110000100111 |
| 193 | −0.5 | 4.5 | 13 | 0110000111010 |
| 194 | −1.5 | −2 | 13 | 0110001010000 |
| 195 | −1.5 | −3.5 | 13 | 0110001010001 |
| 196 | −2 | 2.5 | 13 | 0110001010010 |
| 197 | −1 | 4 | 13 | 0110001010011 |
| 198 | −2.5 | 2.5 | 13 | 0110001110110 |
| 199 | 1.5 | 3.5 | 14 | 00000100000100 |
| 200 | −15 | 0 | 14 | 00001000000101 |
| 201 | 3 | 2 | 14 | 00001000000110 |
| 202 | 4 | 0.5 | 14 | 00001100000001 |
| 203 | 1 | 3.5 | 14 | 00001100000010 |
| 204 | 2.5 | −3.5 | 14 | 00001100000011 |
| 205 | −1.5 | −3 | 14 | 00001100000100 |
| 206 | 3 | −2 | 14 | 00001100000101 |
| 207 | 5.5 | −0.5 | 14 | 00001100011000 |
| 208 | −3 | −2 | 14 | 00001100011001 |
| 209 | 0 | 5 | 14 | 00001100011010 |
| 210 | 0.5 | −4.5 | 14 | 00001100011011 |
| 211 | 5 | −0.5 | 14 | 00001100011110 |
| 212 | −4 | 0.5 | 14 | 00001111011010 |
| 213 | 4 | −0.5 | 14 | 00001111011011 |
| 214 | −2 | 3.5 | 14 | 00001111011100 |
| 215 | 0 | −15.5 | 14 | 00001111011101 |
| 216 | 0 | 13.5 | 14 | 00011001001000 |
| 217 | 0 | −5 | 14 | 00011001001001 |
| 218 | 2 | −2.5 | 14 | 00011001011110 |
| 219 | 0 | −14 | 14 | 00011001011111 |
| 220 | 5.5 | 0.5 | 14 | 00011010010000 |
| 221 | −3.5 | 1 | 14 | 00011010010001 |
| 222 | −5.5 | 0.5 | 14 | 00011100101101 |
| 223 | −0.5 | −4 | 14 | 00011100101110 |
| 224 | −1 | 4.5 | 14 | 00011100101111 |
| 225 | −0.5 | −14.5 | 14 | 00011100110000 |
| 226 | 4.5 | 1.5 | 14 | 00011100110001 |
| 227 | −1.5 | 4.5 | 14 | 00100100011010 |
| 228 | 0.5 | 4.5 | 14 | 00100100011011 |
| 229 | 2.5 | −2 | 14 | 00100100111010 |
| 230 | −3 | 2 | 14 | 00100100111011 |
| 231 | 2.5 | 2 | 14 | 00101001100010 |
| 232 | −2.5 | −2 | 14 | 00101001110001 |
| 233 | 13.5 | 0.5 | 14 | 00101001110010 |
| 234 | −4.5 | 1.5 | 14 | 00101001110011 |
| 235 | 0.5 | −5.5 | 14 | 00101011100100 |
| 236 | 1.5 | −4.5 | 14 | 00101011100101 |
| 237 | −0.5 | −5.5 | 14 | 00101011101101 |
| 238 | −0.5 | −5 | 14 | 00101011101110 |
| 239 | 2.5 | 2.5 | 14 | 00101011101111 |
| 240 | 3 | −2.5 | 14 | 00101011110000 |
| 241 | 3.5 | −2.5 | 14 | 00101011110001 |
| 242 | 0 | 5.5 | 14 | 00101011110010 |
| 243 | −4.5 | −1.5 | 14 | 00101011110011 |
| 244 | 0 | 14 | 14 | 00101011110100 |
| 245 | −2.5 | 3.5 | 14 | 00101011110101 |
| 246 | 2.5 | −2.5 | 14 | 00101011111100 |
| 247 | 2 | −3.5 | 14 | 01001000010101 |
| 248 | −0.5 | 13.5 | 14 | 01001000010110 |
| 249 | 4 | 1 | 14 | 01001000010111 |
| 250 | −3.5 | −2.5 | 14 | 01001000011000 |
| 251 | −2.5 | −2.5 | 14 | 01001000011001 |
| 252 | 3 | −3 | 14 | 01001000011010 |
| 253 | −0.5 | 4 | 14 | 01001000011011 |
| 254 | 2 | 2.5 | 14 | 01001000011100 |
| 255 | −2 | −2.5 | 14 | 01001000011101 |
| 256 | −0.5 | 14.5 | 14 | 01001001101111 |
| 257 | 2 | −3 | 14 | 01001001110100 |
| 258 | −3.5 | 3.5 | 14 | 01001001110101 |
| 259 | 6.5 | 0.5 | 14 | 01001001110110 |
| 260 | −14.5 | −0.5 | 14 | 01001001110111 |
| 261 | 1 | −5 | 14 | 01001010010000 |
| 262 | 3 | 2.5 | 14 | 01001010010001 |
| 263 | 3.5 | −3.5 | 14 | 01001010010010 |
| 264 | 4 | −1 | 14 | 01001010010011 |
| 265 | 3 | −3.5 | 14 | 01001010011010 |
| 266 | −1 | −4 | 14 | 01001011001010 |
| 267 | 0 | 14.5 | 14 | 01001011001011 |
| 268 | −6.5 | −0.5 | 14 | 01001011001100 |
| 269 | −4 | 1 | 14 | 01001011001101 |
| 270 | −3.5 | −3.5 | 14 | 01001011001110 |
| 271 | −3 | 3 | 14 | 01001011001111 |
| 272 | 6.5 | 0 | 14 | 01001011101000 |
| 273 | −6 | 0 | 14 | 01001011101001 |
| 274 | −4 | −1 | 14 | 01001011110100 |
| 275 | 0.5 | −14.5 | 14 | 01001011110101 |
| 276 | 0.5 | 14.5 | 14 | 01001111011101 |
| 277 | −0.5 | 5.5 | 14 | 01001111011110 |
| 278 | 4.5 | −1.5 | 14 | 01001111011111 |
| 279 | 1 | −4.5 | 14 | 01001111100000 |

TABLE 1-continued

XY Joint VLC Motion Vector Table for Talking Head Video

| Index | Mv_x | Mv_y | Number of bits | Code |
|---|---|---|---|---|
| 280 | 3.5 | −2 | 14 | 01001111100001 |
| 281 | 7.5 | 0 | 14 | 01001111100010 |
| 282 | 4 | −2 | 14 | 01001111100011 |
| 283 | 13 | 0 | 14 | 01001111100100 |
| 284 | 13.5 | −0.5 | 14 | 01001111100101 |
| 285 | 4.5 | 1 | 14 | 01001111100110 |
| 286 | 0.5 | −13.5 | 14 | 01001111100111 |
| 287 | −14.5 | 0.5 | 14 | 01001111101000 |
| 288 | −7.5 | 0 | 14 | 01001111101001 |
| 289 | 14.5 | 0.5 | 14 | 01001111101010 |
| 290 | 5 | 0.5 | 14 | 01001111101011 |
| 291 | −1 | 5 | 14 | 01100001000100 |
| 292 | −3 | 2.5 | 14 | 01100001000101 |
| 293 | −1.5 | −4.5 | 14 | 01100001000110 |
| 294 | 2 | 3 | 14 | 01100001000111 |
| 295 | 14.5 | −0.5 | 14 | 01100001001000 |
| 296 | 0.5 | 4 | 14 | 01100001001001 |
| 297 | 2.5 | −3 | 14 | 01100001001010 |
| 298 | 15 | 0 | 14 | 01100001001011 |
| 299 | −2 | −3 | 14 | 01100011110110 |
| 300 | −3.5 | 2.5 | 14 | 01100011011001 |
| 301 | 3 | 3 | 14 | 01100011011010 |
| 302 | −3.5 | 2 | 14 | 01100011011011 |
| 303 | 3 | −4 | 14 | 01100011101110 |
| 304 | −7.5 | −1.5 | 14 | 01100011101111 |
| 305 | −4.5 | −1 | 15 | 000010000001110 |
| 306 | 1 | −6 | 15 | 000010000001111 |
| 307 | 0.5 | −5 | 15 | 000010000110100 |
| 308 | −5.5 | −1.5 | 15 | 000010000110101 |
| 309 | 0.5 | −4 | 15 | 000010000110110 |
| 310 | 8.5 | 0 | 15 | 000010000110111 |
| 311 | −2.5 | 4.5 | 15 | 000011000000000 |
| 312 | 0 | −15 | 15 | 000011000000001 |
| 313 | −4.5 | 1 | 15 | 000011110101001 |
| 314 | −2.5 | −3.5 | 15 | 000011110101010 |
| 315 | −5 | 0.5 | 15 | 000011110101011 |
| 316 | −4 | −1.5 | 15 | 000011110101100 |
| 317 | −5 | −0.5 | 15 | 000011110101101 |
| 318 | 3.5 | 3.5 | 15 | 000011110101110 |
| 319 | 5.5 | 1.5 | 15 | 000011110101111 |
| 320 | −2.5 | 2 | 15 | 000011110110000 |
| 321 | 2.5 | −4 | 15 | 000011110110001 |
| 322 | −13 | 0 | 15 | 000011110110010 |
| 323 | 5 | −1 | 15 | 000011110110011 |
| 324 | 7.5 | 0.5 | 15 | 000110010110000 |
| 325 | −3 | −2.5 | 15 | 000110010110001 |
| 326 | −1 | 6 | 15 | 000110010110010 |
| 327 | −0.5 | 14 | 15 | 000110010110011 |
| 328 | 4.5 | −1 | 15 | 000110010110100 |
| 329 | 3.5 | 2 | 15 | 000110010110101 |
| 330 | 0.5 | −6.5 | 15 | 000110010110110 |
| 331 | −5 | 1 | 15 | 000110010110111 |
| 332 | 6.5 | −0.5 | 15 | 000110010111000 |
| 333 | 2 | −4 | 15 | 000110010111001 |
| 334 | 0 | −8 | 15 | 000110010111010 |
| 335 | 6.5 | 1.5 | 15 | 000110010111011 |
| 336 | −6.5 | 0 | 15 | 000111001011000 |
| 337 | −5 | 3 | 15 | 001001000100100 |
| 338 | −1 | −5.5 | 15 | 001001000100101 |
| 339 | −13.5 | 0.5 | 15 | 001001000100110 |
| 340 | −13.5 | −0.5 | 15 | 001001000100111 |
| 341 | −7.5 | −0.5 | 15 | 001001000101000 |
| 342 | −1.5 | −5.5 | 15 | 001001000101001 |
| 343 | −5 | 1.5 | 15 | 001001000101010 |
| 344 | −0.5 | −13.5 | 15 | 001001000101011 |
| 345 | −0.5 | −7.5 | 15 | 001001000101100 |
| 346 | 5.5 | −1.5 | 15 | 001001000101101 |
| 347 | 2.5 | 3 | 15 | 001001000101110 |
| 348 | −2.5 | 3 | 15 | 001001000101111 |
| 349 | 0 | −7 | 15 | 001001000110000 |
| 350 | 0 | 13 | 15 | 001001000110001 |
| 351 | 0 | −6.5 | 15 | 001001000110010 |
| 352 | 0.5 | 5.5 | 15 | 001001000110011 |
| 353 | 1 | 4.5 | 15 | 001010011000110 |
| 354 | 5.5 | −1 | 15 | 001010011000111 |
| 355 | 1.5 | 4.5 | 15 | 001010011001100 |
| 356 | −1.5 | 5.5 | 15 | 001010011001101 |
| 357 | −3 | 3.5 | 15 | 001010011001110 |
| 358 | −5 | −1.5 | 15 | 001010011001111 |
| 359 | 0 | −12.5 | 15 | 001010011010000 |
| 360 | −6.5 | −1.5 | 15 | 001010011010001 |
| 361 | 0 | −7.5 | 15 | 001010011010010 |
| 362 | −3.5 | −2 | 15 | 001010011010011 |
| 363 | −0.5 | −6.5 | 15 | 001010011010100 |
| 364 | 4.5 | −2 | 15 | 001010011010101 |
| 365 | 8.5 | −0.5 | 15 | 001010011010110 |
| 366 | −2 | −3.5 | 15 | 001010011010111 |
| 367 | 1 | −6.5 | 15 | 001010011011000 |
| 368 | −2 | 4 | 15 | 001010011011001 |
| 369 | 3.5 | −3 | 15 | 001010011011010 |
| 370 | 1 | −5.5 | 15 | 001010011011011 |
| 371 | −6.5 | 0.5 | 15 | 001010011011100 |
| 372 | 2.5 | 3.5 | 15 | 001010011011101 |
| 373 | 3 | −4.5 | 15 | 001010011011110 |
| 374 | −1.5 | 4 | 15 | 001010011011111 |
| 375 | −5.5 | −1 | 15 | 001010011100000 |
| 376 | 2 | 3.5 | 15 | 001010011100001 |
| 377 | 5 | 1 | 15 | 001010111011000 |
| 378 | −4 | 1.5 | 15 | 010010000011011 |
| 379 | 8 | 0 | 15 | 010010000011100 |
| 380 | −8 | 0 | 15 | 010010000011101 |
| 381 | −2 | −4 | 15 | 010010000011110 |
| 382 | 8.5 | 0.5 | 15 | 010010000011111 |
| 383 | −5 | −1 | 15 | 010010000100000 |
| 384 | 1 | 4 | 15 | 010010000100001 |
| 385 | −0.5 | 7.5 | 15 | 010010000100010 |
| 386 | 3 | 3.5 | 15 | 010010000100011 |
| 387 | 3.5 | 2.5 | 15 | 010010000100100 |
| 388 | 6 | 0 | 15 | 010010000100101 |
| 389 | −10.5 | 0.5 | 15 | 010010000100110 |
| 390 | 1.5 | −4 | 15 | 010010000100111 |
| 391 | −1 | −4.5 | 15 | 010010000101000 |
| 392 | 0.5 | 6.5 | 15 | 010010000101001 |
| 393 | 0.5 | 7.5 | 15 | 010010011011100 |
| 394 | −4.5 | −2.5 | 15 | 010010011011101 |
| 395 | −2 | −4.5 | 15 | 010010100110110 |
| 396 | 0.5 | 5 | 15 | 010010100110111 |
| 397 | 7 | 0 | 15 | 010010110000000 |
| 398 | −8.5 | 0 | 15 | 010010110000001 |
| 399 | −9.5 | 0.5 | 15 | 010010110000010 |
| 400 | −4 | 2 | 15 | 010010110000011 |
| 401 | 4.5 | 2.5 | 15 | 010010110000100 |
| 402 | −4 | 2.5 | 15 | 010010110000101 |
| 403 | 1 | −7.5 | 15 | 010010110000110 |
| 404 | 1 | −7 | 15 | 010010110000111 |
| 405 | −1 | −5 | 15 | 010010110001000 |
| 406 | −3 | 4 | 15 | 010010110001001 |
| 407 | −4 | 3 | 15 | 010010110001010 |
| 408 | −9 | 0 | 15 | 010010110001011 |
| 409 | 14 | −0.5 | 15 | 010010110001100 |
| 410 | −5.5 | 1.5 | 15 | 010010110001101 |
| 411 | −1.5 | −4 | 15 | 010010110001110 |
| 412 | 3.5 | −7.5 | 15 | 010010110001111 |
| 413 | −4.5 | −3.5 | 15 | 010010110010000 |
| 414 | 1.5 | −7.5 | 15 | 010010110010001 |
| 415 | 2.5 | −4.5 | 15 | 010010110010010 |
| 416 | 15.5 | 0.5 | 15 | 010010110010011 |
| 417 | 6.5 | 1 | 15 | 010011110100010 |
| 418 | 0.5 | 9.5 | 15 | 010011110100011 |
| 419 | 1 | 5 | 15 | 010011110100100 |
| 420 | 7.5 | −0.5 | 15 | 010011110100101 |
| 421 | 4.5 | 2 | 15 | 010011110100110 |
| 422 | −5 | 2 | 15 | 010011110100111 |
| 423 | 5 | −1.5 | 15 | 010011110101000 |
| 424 | 1.5 | −5.5 | 15 | 010011110101001 |
| 425 | 1.5 | −5 | 15 | 010011110101010 |
| 426 | −4.5 | 2.5 | 15 | 010011110101011 |
| 427 | 0 | 6 | 15 | 010011110101100 |
| 428 | 1.5 | 5.5 | 15 | 010011110101101 |
| 429 | 5.5 | −3.5 | 15 | 010011110101110 |

TABLE 1-continued

XY Joint VLC Motion Vector Table for Talking Head Video

| Index | Mv_x | Mv_y | Number of bits | Code |
|---|---|---|---|---|
| 430 | 0 | 7.5 | 15 | 010011110101111 |
| 431 | −12.5 | 0.5 | 15 | 010011110110000 |
| 432 | −0.5 | 6.5 | 15 | 010011110110001 |
| 433 | 4.5 | −2.5 | 15 | 010011110110010 |
| 434 | −6 | −0.5 | 15 | 010011110110011 |
| 435 | −0.5 | 13 | 15 | 010011110110100 |
| 436 | −8 | −0.5 | 15 | 010011110110101 |
| 437 | −9.5 | 0 | 15 | 010011110110110 |
| 438 | 15.5 | −0.5 | 15 | 010011110110111 |
| 439 | −3.5 | 3 | 15 | 010011110111000 |
| 440 | −1 | 5.5 | 15 | 010011110111001 |
| 441 | 0 | −6 | 15 | 011000011101110 |
| 442 | 1.5 | 7.5 | 15 | 011000011101111 |
| 443 | −1 | 6.5 | 15 | 011000110001000 |
| 444 | −1 | 11 | 15 | 011000110001001 |
| 445 | −0.5 | −15.5 | 15 | 011000110001010 |
| 446 | 5 | −3 | 15 | 011000110001011 |
| 447 | 7.5 | 1 | 15 | 011000110001100 |
| 448 | 3.5 | 3 | 15 | 011000110001101 |
| 449 | 3 | −9 | 15 | 011000110001110 |
| 450 | 4 | −5 | 15 | 011000110001111 |
| 451 | 4 | −4 | 15 | 011000110100000 |
| 452 | 9.5 | 0.5 | 15 | 011000110100001 |
| 453 | 11.5 | 1 | 15 | 011000110100010 |
| 454 | 12 | 0 | 15 | 011000110100011 |
| 455 | −7 | 0 | 15 | 011000110100100 |
| 456 | −5.5 | 2.5 | 15 | 011000110100101 |
| 457 | 3.5 | −5.5 | 15 | 011000110100110 |
| 458 | 3.5 | −4.5 | 15 | 011000110100111 |
| 459 | 0.5 | 8.5 | 15 | 011000110101000 |
| 460 | −7.5 | 1.5 | 15 | 011000110101001 |
| 461 | 4.5 | −4.5 | 15 | 011000110101010 |
| 462 | −4.5 | −2 | 15 | 011000110101011 |
| 463 | −4 | 3.5 | 15 | 011000110101100 |
| 464 | 5.5 | 3.5 | 15 | 011000110101101 |
| 465 | −3.5 | −4.5 | 15 | 011000110101110 |
| 466 | −0.5 | 11.5 | 15 | 011000110101111 |
| 467 | −6 | 0.5 | 15 | 011000110110000 |
| 468 | −6.5 | −1 | 15 | 011000110110001 |
| 469 | 6.5 | −1 | 16 | 0000110001111100 |
| 470 | −15.5 | 15.5 | 16 | 0000110001111101 |
| 471 | 1 | −8 | 16 | 0000110001111110 |
| 472 | −0.5 | 5 | 16 | 0000110001111111 |
| 473 | −5 | −2 | 16 | 0000111100110000 |
| 474 | 1.5 | −9.5 | 16 | 0000111100110001 |
| 475 | −8.5 | 0.5 | 16 | 0000111100110010 |
| 476 | 7 | 0.5 | 16 | 0000111100110011 |
| 477 | 7 | 1.5 | 16 | 0000111100110100 |
| 478 | 1.5 | −6.5 | 16 | 0000111100110101 |
| 479 | −0.5 | 7 | 16 | 0000111100110110 |
| 480 | −2 | 5.5 | 16 | 0000111100110111 |
| 481 | −1.5 | −7.5 | 16 | 0000111100111000 |
| 482 | −1.5 | −6.5 | 16 | 0000111100111001 |
| 483 | −4.5 | 2 | 16 | 0000111100111010 |
| 484 | 4.5 | 3.5 | 16 | 0000111100111011 |
| 485 | −2.5 | −4 | 16 | 0000111100111100 |
| 486 | −9 | −0.5 | 16 | 0000111100111101 |
| 487 | 10.5 | 0 | 16 | 0000111100111110 |
| 488 | 10.5 | 0.5 | 16 | 0000111100111111 |
| 489 | −2.5 | −3 | 16 | 0000111101000000 |
| 490 | −4 | −2 | 16 | 0000111101000001 |
| 491 | 0 | 15 | 16 | 0000111101000010 |
| 492 | 12.5 | 0.5 | 16 | 0000111101000011 |
| 493 | 0 | 15.5 | 16 | 0000111101000100 |
| 494 | −7.5 | 0.5 | 16 | 0000111101000101 |
| 495 | 5 | 3.5 | 16 | 0000111101000110 |
| 496 | 2.5 | −6.5 | 16 | 0000111101000111 |
| 497 | −1.5 | 8.5 | 16 | 0000111101001000 |
| 498 | 0.5 | −7.5 | 16 | 0000111101001001 |
| 499 | −15.5 | −0.5 | 16 | 0000111101001010 |
| 500 | −3.5 | 5.5 | 16 | 0000111101001011 |
| 501 | 0 | −9.5 | 16 | 0000111101001100 |
| 502 | 0 | −8.5 | 16 | 0000111101001101 |
| 503 | 15.5 | −1.5 | 16 | 0000111101001110 |
| 504 | −3 | −3.5 | 16 | 0000111101001111 |
| 505 | 4 | 1.5 | 16 | 0000111101010000 |
| 506 | 6 | 0.5 | 16 | 0000111101010001 |
| 507 | 2 | −4.5 | 16 | 0001110010110010 |
| 508 | −0.5 | 8.5 | 16 | 0001110010110011 |
| 509 | 3.5 | 4.5 | 16 | 0010000011001000 |
| 510 | −6 | −2 | 16 | 0010000011001001 |
| 511 | −6 | −1.5 | 16 | 0010000011001010 |
| 512 | 6 | 1 | 16 | 0010000011001011 |
| 513 | −4.5 | 3 | 16 | 0010000011001100 |
| 514 | 0.5 | −12.5 | 16 | 0010000011001101 |
| 515 | 1 | 14.5 | 16 | 0010000011001110 |
| 516 | 1.5 | −10.5 | 16 | 0010000011001111 |
| 517 | 0.5 | 9 | 16 | 0010000011100000 |
| 518 | 0.5 | −9.5 | 16 | 0010000011100001 |
| 519 | −2 | 4.5 | 16 | 0010000011100010 |
| 520 | 4.5 | −6.5 | 16 | 0010000011100011 |
| 521 | −4.5 | 7.5 | 16 | 0010000011100100 |
| 522 | 4.5 | −3.5 | 16 | 0010000011100101 |
| 523 | 4.5 | −3 | 16 | 0010000011100110 |
| 524 | −1.5 | −8.5 | 16 | 0010000011100111 |
| 525 | −3.5 | 5 | 16 | 0010000011101000 |
| 526 | −3 | 4.5 | 16 | 0010000011101001 |
| 527 | 8.5 | −1.5 | 16 | 0010000011101010 |
| 528 | −1.5 | 6.5 | 16 | 0010000011101011 |
| 529 | −4 | −2.5 | 16 | 0010000011101100 |
| 530 | 2.5 | −7.5 | 16 | 0010000011101101 |
| 531 | 8.5 | 1.5 | 16 | 0010000011101110 |
| 532 | 9 | 0 | 16 | 0010000011101111 |
| 533 | 9.5 | −1.5 | 16 | 0010000011110000 |
| 534 | 9.5 | 0 | 16 | 0010000011110001 |
| 535 | −3 | −4 | 16 | 0010000011110010 |
| 536 | 3.5 | −9.5 | 16 | 0010000011110011 |
| 537 | −3.5 | −3 | 16 | 0010000011110100 |
| 538 | −3 | −3 | 16 | 0010000011110101 |
| 539 | −8.5 | −0.5 | 16 | 0010000011110110 |
| 540 | 3.5 | −4 | 16 | 0010000011110111 |
| 541 | −7 | 0.5 | 16 | 0010000011111000 |
| 542 | 5 | −2 | 16 | 0010000011111001 |
| 543 | −7.5 | −1 | 16 | 0010000011111010 |
| 544 | −14 | −0.5 | 16 | 0010000011111011 |
| 545 | −0.5 | −10.5 | 16 | 0010000011111100 |
| 546 | 0 | 6.5 | 16 | 0010000011111101 |
| 547 | 0 | 7 | 16 | 0010000011111110 |
| 548 | 14 | 0.5 | 16 | 0010000011111111 |
| 549 | −15.5 | 0.5 | 16 | 0010010001000000 |
| 550 | 5 | 1.5 | 16 | 0010010001000001 |
| 551 | 0 | 12.5 | 16 | 0010010001000010 |
| 552 | −16 | 0 | 16 | 0010010001000011 |
| 553 | −10 | 0 | 16 | 0010010001000100 |
| 554 | −6.5 | 1.5 | 16 | 0010010001000101 |
| 555 | 1.5 | 6.5 | 16 | 0010010001000110 |
| 556 | −5.5 | 1 | 16 | 0010010001000111 |
| 557 | 4.5 | −10.5 | 16 | 0010101110110010 |
| 558 | −7.5 | 2.5 | 16 | 0010101110110011 |
| 559 | −3 | 5 | 16 | 0010101111110100 |
| 560 | −6 | 3.5 | 16 | 0010101111110101 |
| 561 | 6.5 | 2.5 | 16 | 0010101111110110 |
| 562 | 7 | −0.5 | 16 | 0010101111110111 |
| 563 | 0 | 8.5 | 16 | 0010111111101000 |
| 564 | 2.5 | −5.5 | 16 | 0010111111101001 |
| 565 | −5 | −2.5 | 16 | 0010111111101010 |
| 566 | 7.5 | −1.5 | 16 | 0010111111101011 |
| 567 | −1.5 | 7.5 | 16 | 0010111111101100 |
| 568 | −0.5 | 10.5 | 16 | 0010111111101101 |
| 569 | −2.5 | 4 | 16 | 0010111111101110 |
| 570 | −1.5 | 9.5 | 16 | 0010111111101111 |
| 571 | −1 | −8 | 16 | 0010111111110000 |
| 572 | −5.5 | −3 | 16 | 0010111111110001 |
| 573 | 0.5 | −15.5 | 16 | 0010111111110010 |
| 574 | 1.5 | 4 | 16 | 0010111111110011 |
| 575 | −7 | −1 | 16 | 0010111111110100 |
| 576 | −3.5 | 4.5 | 16 | 0010111111110101 |
| 577 | 0.5 | 6 | 16 | 0010111111110110 |
| 578 | 9 | 1 | 16 | 0010111111110111 |
| 579 | 9.5 | −3.5 | 16 | 0010111111111000 |

TABLE 1-continued

XY Joint VLC Motion Vector Table for Talking Head Video

| Index | Mv_x | Mv_y | Number of bits | Code |
|---|---|---|---|---|
| 580 | 5 | -2.5 | 16 | 0010111111111001 |
| 581 | -15 | -0.5 | 16 | 0010111111111010 |
| 582 | -8.5 | 1.5 | 16 | 0010111111111011 |
| 583 | 9.5 | 1.5 | 16 | 0010111111111100 |
| 584 | 10.5 | -0.5 | 16 | 0010111111111101 |
| 585 | 0.5 | -8.5 | 16 | 0010111111111110 |
| 586 | -3.5 | 8.5 | 16 | 0010111111111111 |
| 587 | -1.5 | -15.5 | 16 | 0100100000100000 |
| 588 | 11.5 | 1.5 | 16 | 0100100000100001 |
| 589 | 2.5 | 4 | 16 | 0100100000100010 |
| 590 | 3 | -13.5 | 16 | 0100100000100011 |
| 591 | 0.5 | 13 | 16 | 0100100000100100 |
| 592 | 3 | -5.5 | 16 | 0100100000100101 |
| 593 | 13.5 | -1.5 | 16 | 0100100000100110 |
| 594 | 3 | -5 | 16 | 0100100000100111 |
| 595 | 0.5 | 13.5 | 16 | 0100100000101000 |
| 596 | 3.5 | 6.5 | 16 | 0100100000101001 |
| 597 | -9.5 | -0.5 | 16 | 0100100000101010 |
| 598 | 0 | -11.5 | 16 | 0100100000101011 |
| 599 | 4 | -3 | 16 | 0100100000101100 |
| 600 | 14.5 | -11.5 | 16 | 0100100000101101 |
| 601 | 14.5 | -1.5 | 16 | 0100100000101110 |
| 602 | 0 | -10.5 | 16 | 0100100000101111 |
| 603 | -11.5 | 0 | 16 | 0100100000110000 |
| 604 | 6 | -1 | 16 | 0100100000110001 |
| 605 | -14.5 | -14.5 | 16 | 0100100000110010 |
| 606 | -0.5 | -9.5 | 16 | 0100100000110011 |
| 607 | -1.5 | -6 | 16 | 0100100000110100 |
| 608 | -3.5 | -7 | 16 | 0100100000110101 |
| 609 | -0.5 | -6 | 16 | 0100111010100000 |
| 610 | -2.5 | -10.5 | 16 | 0100111010100001 |
| 611 | -4.5 | -14.5 | 16 | 0100111010100010 |
| 612 | -11.5 | -1.5 | 16 | 0100111010100011 |
| 613 | -3.5 | 4 | 16 | 0100111010100100 |
| 614 | -11.5 | -0.5 | 16 | 0100111010100101 |
| 615 | -1.5 | 10.5 | 16 | 0100111010100110 |
| 616 | -6 | -1 | 16 | 0100111010100111 |
| 617 | -1 | -7.5 | 16 | 0100111010101000 |
| 618 | -1 | -6 | 16 | 0100111010101001 |
| 619 | 5 | 2.5 | 16 | 0100111010101010 |
| 620 | -7 | -0.5 | 16 | 0100111010101011 |
| 621 | -2 | 5 | 16 | 0100111010101100 |
| 622 | -3.5 | 7.5 | 16 | 0100111010101101 |
| 623 | -2 | 7.5 | 16 | 0100111010101110 |
| 624 | -2 | 11 | 16 | 0100111010101111 |
| 625 | -5.5 | 3 | 16 | 0100111010110000 |
| 626 | -1.5 | -11.5 | 16 | 0100111010110001 |
| 627 | 5.5 | 1 | 16 | 0100111010110010 |
| 628 | -1.5 | -9.5 | 16 | 0100111010110011 |
| 629 | 5.5 | 2.5 | 16 | 0100111010110100 |
| 630 | -3 | -5.5 | 16 | 0100111010110101 |
| 631 | 6 | -3.5 | 16 | 0100111010110110 |
| 632 | 6 | -2.5 | 16 | 0100111010110111 |
| 633 | -5.5 | 5.5 | 16 | 0100111010111000 |
| 634 | 3 | 5 | 16 | 0100111010111001 |
| 635 | -5.5 | 6.5 | 16 | 0100111010111010 |
| 636 | -4 | 4 | 16 | 0100111010111011 |
| 637 | 6.5 | -3.5 | 16 | 0100111010111100 |
| 638 | 6.5 | -2.5 | 16 | 0100111010111101 |
| 639 | 1.5 | 7 | 16 | 0100111010111110 |
| 640 | 3.5 | -5 | 16 | 0100111010111111 |
| 641 | -5 | -3.5 | 16 | 0100111100000000 |
| 642 | 1.5 | 10.5 | 16 | 0100111100000001 |
| 643 | 2 | -6 | 16 | 0100111100000010 |
| 644 | 1 | -15 | 16 | 0100111100000011 |
| 645 | 1 | -9 | 16 | 0100111100000100 |
| 646 | 6.5 | 3.5 | 16 | 0100111100000101 |
| 647 | 1 | -8.5 | 16 | 0100111100000110 |
| 648 | -1.5 | -5 | 16 | 0100111100000111 |
| 649 | -0.5 | 6 | 16 | 0100111100001000 |
| 650 | 7 | 1 | 16 | 0100111100001001 |
| 651 | -3.5 | -5.5 | 16 | 0100111100001010 |
| 652 | 7 | 3 | 16 | 0100111100001011 |
| 653 | -8 | 0.5 | 16 | 0100111100001100 |
| 654 | -7.5 | -2.5 | 16 | 0100111100001101 |
| 655 | -0.5 | 8 | 16 | 0100111100001110 |
| 656 | -6 | 1 | 16 | 0100111100001111 |
| 657 | 0 | 10 | 16 | 0100111100010000 |
| 658 | 7.5 | 1.5 | 16 | 0100111100010001 |
| 659 | 7.5 | 7.5 | 16 | 0100111100010010 |
| 660 | 7.5 | 8.5 | 16 | 0100111100010011 |
| 661 | 0 | 11 | 16 | 0100111100010100 |
| 662 | 8.5 | -15 | 16 | 0100111100010101 |
| 663 | 8.5 | -9.5 | 16 | 0100111100010110 |
| 664 | 8.5 | -4.5 | 16 | 0100111100010111 |
| 665 | -0.5 | 10 | 16 | 0100111100011000 |
| 666 | -15.5 | -1.5 | 16 | 0100111100011001 |
| 667 | -2.5 | 6.5 | 16 | 0100111100011010 |
| 668 | -2 | -5 | 16 | 0100111100011011 |
| 669 | 3.5 | 8.5 | 16 | 0100111100011100 |
| 670 | 3.5 | 11 | 16 | 0100111100011101 |
| 671 | -5.5 | -5.5 | 16 | 0100111100011110 |
| 672 | 2 | 4 | 16 | 0100111100011111 |
| 673 | -4.5 | 5 | 16 | 0100111100100000 |
| 674 | 9.5 | -0.5 | 16 | 0100111100100001 |
| 675 | -15 | -1 | 16 | 0100111100100010 |
| 676 | 4 | -1.5 | 16 | 0100111100100011 |
| 677 | 9.5 | 1 | 16 | 0100111100100100 |
| 678 | 0 | -16 | 16 | 0100111100100101 |
| 679 | 10.5 | -3.5 | 16 | 0100111100100110 |
| 680 | -4 | -4.5 | 16 | 0100111100100111 |
| 681 | -1 | 9.5 | 16 | 0100111100101000 |
| 682 | -4 | -4 | 16 | 0100111100101001 |
| 683 | -1 | 13.5 | 16 | 0100111100101010 |
| 684 | -5.5 | -2 | 16 | 0100111100101011 |
| 685 | 4 | 3 | 16 | 0100111100101100 |
| 686 | 12.5 | -1.5 | 16 | 0100111100101101 |
| 687 | 12.5 | -0.5 | 16 | 0100111100101110 |
| 688 | -0.5 | -15 | 16 | 0100111100101111 |
| 689 | 4.5 | -9.5 | 16 | 0100111100110000 |
| 690 | 13 | -0.5 | 16 | 0100111100110001 |
| 691 | 0 | -12 | 16 | 0100111100110010 |
| 692 | -10 | -0.5 | 16 | 0100111100110011 |
| 693 | -14 | 0.5 | 16 | 0100111100110100 |
| 694 | 0 | -10 | 16 | 0100111100110101 |
| 695 | 1 | 6.5 | 16 | 0100111100110110 |
| 696 | 13.5 | 4.5 | 16 | 0100111100110111 |
| 697 | -0.5 | -12.5 | 16 | 0100111100111000 |
| 698 | 0 | -9 | 16 | 0100111100111001 |
| 699 | -9.5 | -1 | 16 | 0100111100111010 |
| 700 | -11.5 | -3.5 | 16 | 0100111100111011 |
| 701 | 1.5 | -7 | 16 | 0100111100111100 |
| 702 | -3 | 5.5 | 16 | 0100111100111101 |
| 703 | 1.5 | -6 | 16 | 0100111100111110 |
| 704 | 2.5 | 5.5 | 16 | 0100111100111111 |
| 705 | 14.5 | 1.5 | 16 | 0100111101000000 |
| 706 | 2.5 | 6 | 16 | 0100111101000001 |
| 707 | 15.5 | -15.5 | 16 | 0100111101000010 |
| 708 | -3 | 8.5 | 16 | 0100111101000011 |
| 709 | ESC | ESC | 7 | 0010001 |

TABLE 2

XY Joint VLC Motion Vector Table for General Video

| Index | Mv_x | Mv_y | Number of bits | Code |
|---|---|---|---|---|
| 0 | 0 | 0 | 1 | 0 |
| 1 | -0.5 | 0 | 5 | 10011 |
| 2 | 0 | -0.5 | 5 | 10101 |
| 3 | 0.5 | 0 | 5 | 11001 |
| 4 | -0.5 | -0.5 | 5 | 11011 |
| 5 | 0 | 0.5 | 6 | 100100 |
| 6 | 0.5 | -0.5 | 6 | 111000 |
| 7 | 0.5 | 0.5 | 6 | 111001 |
| 8 | -0.5 | 0.5 | 6 | 111101 |

TABLE 2-continued

XY Joint VLC Motion Vector Table for General Video

| Index | Mv_x | Mv_y | Number of bits | Code |
|---|---|---|---|---|
| 9 | 1 | 0 | 7 | 1011101 |
| 10 | −1 | 0 | 7 | 1101000 |
| 11 | 0 | −1 | 7 | 1110110 |
| 12 | 0 | 1 | 8 | 10010111 |
| 13 | 1 | −0.5 | 8 | 10111101 |
| 14 | −1 | −0.5 | 8 | 11000111 |
| 15 | 1.5 | 0 | 8 | 11010110 |
| 16 | −1 | 0.5 | 8 | 11101010 |
| 17 | −0.5 | −1 | 8 | 11101110 |
| 18 | 0.5 | −1 | 8 | 11110000 |
| 19 | −1.5 | 0 | 8 | 11110001 |
| 20 | 1 | 0.5 | 8 | 11111010 |
| 21 | 0 | −1.5 | 9 | 100101010 |
| 22 | 0.5 | 1 | 9 | 100101100 |
| 23 | −0.5 | 1 | 9 | 101000000 |
| 24 | −1 | −1 | 9 | 101001000 |
| 25 | 0 | 1.5 | 9 | 101100010 |
| 26 | 1 | −1 | 9 | 101101001 |
| 27 | −0.5 | −1.5 | 9 | 101111100 |
| 28 | −1.5 | −0.5 | 9 | 101111110 |
| 29 | 2 | 0 | 9 | 110000001 |
| 30 | 1.5 | −0.5 | 9 | 110000011 |
| 31 | −1 | 1 | 9 | 110001010 |
| 32 | 0.5 | −1.5 | 9 | 110001100 |
| 33 | −2 | 0 | 9 | 110001101 |
| 34 | 1 | 1 | 9 | 110100110 |
| 35 | 0 | −2 | 9 | 110101001 |
| 36 | 1.5 | 0.5 | 9 | 111100110 |
| 37 | −1.5 | 0.5 | 9 | 111110000 |
| 38 | −0.5 | 1.5 | 9 | 111110110 |
| 39 | 0.5 | 1.5 | 10 | 1001010011 |
| 40 | 0 | 2 | 10 | 1010001010 |
| 41 | −2.5 | 0 | 10 | 1010010011 |
| 42 | 0 | −2.5 | 10 | 1010010111 |
| 43 | 2.5 | 0 | 10 | 1010011100 |
| 44 | 0 | −3.5 | 10 | 1011010100 |
| 45 | 0 | 2.5 | 10 | 1011010111 |
| 46 | −2 | −0.5 | 10 | 1011100000 |
| 47 | 2 | −0.5 | 10 | 1011100111 |
| 48 | −1 | −1.5 | 10 | 1011111111 |
| 49 | 3 | 0 | 10 | 1100000000 |
| 50 | −1.5 | −1 | 10 | 1100001010 |
| 51 | −0.5 | −2 | 10 | 1100001100 |
| 52 | 0 | 3.5 | 10 | 1100001110 |
| 53 | 0 | −3 | 10 | 1100010000 |
| 54 | 1.5 | −1 | 10 | 1100010011 |
| 55 | −3 | 0 | 10 | 1101001011 |
| 56 | −1 | −2 | 10 | 1101010000 |
| 57 | 0 | 3 | 10 | 1101011100 |
| 58 | 0.5 | −2 | 10 | 1101011111 |
| 59 | −2.5 | −0.5 | 10 | 1110100110 |
| 60 | −2 | 0.5 | 10 | 1110101100 |
| 61 | 1 | −1.5 | 10 | 1110101110 |
| 62 | −2 | −1 | 10 | 1110101111 |
| 63 | 2 | 0.5 | 10 | 1110111101 |
| 64 | −1.5 | 1 | 10 | 1110111111 |
| 65 | −0.5 | −2.5 | 10 | 1111100100 |
| 66 | 2 | −1 | 10 | 1111100110 |
| 67 | −3.5 | 0 | 10 | 1111101111 |
| 68 | −0.5 | 2 | 10 | 1111110010 |
| 69 | 3.5 | 0 | 10 | 1111110100 |
| 70 | 1 | −2 | 10 | 1111110111 |
| 71 | 1.5 | 1 | 10 | 1111111011 |
| 72 | −2.5 | 0.5 | 10 | 1111111110 |
| 73 | −1.5 | −1.5 | 11 | 10010100100 |
| 74 | −6.5 | 0 | 11 | 10010110101 |
| 75 | 0.5 | −2.5 | 11 | 10010110111 |
| 76 | −0.5 | −3.5 | 11 | 10100001000 |
| 77 | 1.5 | −1.5 | 11 | 10100001100 |
| 78 | −0.5 | 2.5 | 11 | 10100001101 |
| 79 | 2.5 | −0.5 | 11 | 10100010001 |
| 80 | 6.5 | 0 | 11 | 10100010111 |
| 81 | 2.5 | 0.5 | 11 | 10100011001 |
| 82 | 0.5 | 2.5 | 11 | 10100100101 |
| 83 | −1 | 1.5 | 11 | 10100101010 |
| 84 | −2 | 1 | 11 | 10100101100 |
| 85 | 0 | −6.5 | 11 | 10100110000 |
| 86 | 0 | −4 | 11 | 10100110110 |
| 87 | 1.5 | 1.5 | 11 | 10100111101 |
| 88 | 1 | 1.5 | 11 | 10100111110 |
| 89 | −3.5 | −0.5 | 11 | 10100111111 |
| 90 | −1.5 | 1.5 | 11 | 10110000101 |
| 91 | −3.5 | 0.5 | 11 | 10110000110 |
| 92 | 0.5 | −3.5 | 11 | 10110000111 |
| 93 | 0.5 | 2 | 11 | 10110001101 |
| 94 | −5.5 | 0 | 11 | 10110010111 |
| 95 | 5.5 | 0 | 11 | 10110011001 |
| 96 | −0.5 | 3.5 | 11 | 10110100000 |
| 97 | −4 | 0 | 11 | 10110100001 |
| 98 | −1 | 2 | 11 | 10110101011 |
| 99 | 3 | −0.5 | 11 | 10110110101 |
| 100 | −3 | −0.5 | 11 | 10110111000 |
| 101 | −0.5 | −3 | 11 | 10110111010 |
| 102 | 2 | 1 | 11 | 10110111011 |
| 103 | 3.5 | 0.5 | 11 | 10110111100 |
| 104 | −9.5 | 0 | 11 | 10110111110 |
| 105 | 3 | −1 | 11 | 10111000010 |
| 106 | 3 | 0.5 | 11 | 10111001000 |
| 107 | 0.5 | 3.5 | 11 | 10111001100 |
| 108 | −14.5 | 0 | 11 | 10111001101 |
| 109 | 9.5 | 0 | 11 | 10111100100 |
| 110 | 4 | 0 | 11 | 10111100110 |
| 111 | 9 | 0 | 11 | 10111110101 |
| 112 | −0.5 | 3 | 11 | 11000000010 |
| 113 | 3.5 | −0.5 | 11 | 11000001010 |
| 114 | 5 | 0 | 11 | 11000010000 |
| 115 | 6 | 0 | 11 | 11000010001 |
| 116 | 4.5 | 0 | 11 | 11000010011 |
| 117 | 0 | −9.5 | 11 | 11000100010 |
| 118 | −3 | −1 | 11 | 11000100100 |
| 119 | −4.5 | 0 | 11 | 11000100101 |
| 120 | −6 | 0 | 11 | 11000101110 |
| 121 | −1 | −3 | 11 | 11010100010 |
| 122 | 14.5 | 0 | 11 | 11010101001 |
| 123 | −15.5 | 0 | 11 | 11010101011 |
| 124 | 0 | −4.5 | 11 | 11010101100 |
| 125 | 0 | 6.5 | 11 | 11010101111 |
| 126 | −5 | 0 | 11 | 11101000010 |
| 127 | 0 | −14.5 | 11 | 11101000101 |
| 128 | 1 | 2 | 11 | 11101000110 |
| 129 | 8.5 | 0 | 11 | 11101001001 |
| 130 | −3.5 | −1.5 | 11 | 11101001010 |
| 131 | 3 | 1 | 11 | 11101001011 |
| 132 | −11.5 | 0 | 11 | 11101001111 |
| 133 | 0 | 5.5 | 11 | 11101111100 |
| 134 | −2 | −1.5 | 11 | 11110010001 |
| 135 | 0.5 | −3 | 11 | 11110010011 |
| 136 | −2 | −2 | 11 | 11110010100 |
| 137 | 0 | −15.5 | 11 | 11110010101 |
| 138 | −15 | 0 | 11 | 11110010110 |
| 139 | 0 | −6 | 11 | 11110010111 |
| 140 | −8.5 | 0 | 11 | 11110011101 |
| 141 | −9 | 0 | 11 | 11110011110 |
| 142 | −3 | 0.5 | 11 | 11110011111 |
| 143 | 15.5 | 0 | 11 | 11111000101 |
| 144 | 0 | 4 | 11 | 11111000111 |
| 145 | 11.5 | 0 | 11 | 11111001111 |
| 146 | −3.5 | 1.5 | 11 | 11111011101 |
| 147 | 0.5 | 3 | 11 | 11111100001 |
| 148 | −7 | 0 | 11 | 11111100011 |
| 149 | 2.5 | −1 | 11 | 11111100111 |
| 150 | −6.5 | −0.5 | 11 | 11111101010 |
| 151 | 0 | −5.5 | 11 | 11111101100 |
| 152 | −2.5 | −1 | 11 | 11111110000 |
| 153 | 0 | −5 | 11 | 11111110010 |
| 154 | −1 | 3 | 11 | 11111110100 |
| 155 | −3 | 1 | 11 | 11111111010 |
| 156 | 0 | 6 | 12 | 100101000001 |
| 157 | 2.5 | −1.5 | 12 | 100101000110 |
| 158 | 0 | −9 | 12 | 100101001010 |

TABLE 2-continued

XY Joint VLC Motion Vector Table for General Video

| Index | Mv_x | Mv_y | Number of bits | Code |
|---|---|---|---|---|
| 159 | −0.5 | −6.5 | 12 | 100101011001 |
| 160 | 2 | −2 | 12 | 100101011010 |
| 161 | −1.5 | −2 | 12 | 100101011111 |
| 162 | 0 | 4.5 | 12 | 100101101000 |
| 163 | −4 | −0.5 | 12 | 100101101001 |
| 164 | −3.5 | 1 | 12 | 100101101101 |
| 165 | −4 | −1 | 12 | 101000001010 |
| 166 | 0 | 5 | 12 | 101000001101 |
| 167 | −6.5 | 0.5 | 12 | 101000010010 |
| 168 | 1 | −3 | 12 | 101000010101 |
| 169 | −1 | −4 | 12 | 101000011100 |
| 170 | −16 | 0 | 12 | 101000011110 |
| 171 | −1 | −2.5 | 12 | 101000011111 |
| 172 | −3.5 | −1 | 12 | 101000100101 |
| 173 | 1.5 | −2 | 12 | 101000100111 |
| 174 | 2 | −1.5 | 12 | 101000101100 |
| 175 | 3.5 | −1.5 | 12 | 101000110110 |
| 176 | −0.5 | −4 | 12 | 101000110111 |
| 177 | −4 | 1 | 12 | 101000111000 |
| 178 | 0 | −11.5 | 12 | 101000111010 |
| 179 | 0 | 9.5 | 12 | 101000111100 |
| 180 | 3.5 | 1.5 | 12 | 101000111101 |
| 181 | 0 | 8.5 | 12 | 101001010000 |
| 182 | −9.5 | −0.5 | 12 | 101001010011 |
| 183 | −4 | 0.5 | 12 | 101001011011 |
| 184 | −10 | 0 | 12 | 101001100010 |
| 185 | −2.5 | 1.5 | 12 | 101001100100 |
| 186 | −4.5 | 0.5 | 12 | 101001101010 |
| 187 | 6.5 | −0.5 | 12 | 101001110111 |
| 188 | −5.5 | 0.5 | 12 | 101001111000 |
| 189 | 4.5 | 0.5 | 12 | 101100000001 |
| 190 | 0.5 | −4 | 12 | 101100000100 |
| 191 | 3 | −1.5 | 12 | 101100000101 |
| 192 | −2.5 | −1.5 | 12 | 101100000110 |
| 193 | −2 | 1.5 | 12 | 101100001000 |
| 194 | 2.5 | 1 | 12 | 101100011001 |
| 195 | 6.5 | 0.5 | 12 | 101100011101 |
| 196 | −5.5 | −0.5 | 12 | 101100011110 |
| 197 | −2.5 | 1 | 12 | 101100011111 |
| 198 | 1 | 3 | 12 | 101100100001 |
| 199 | 0 | −8.5 | 12 | 101100100010 |
| 200 | 0.5 | −6.5 | 12 | 101100100011 |
| 201 | −7.5 | 0 | 12 | 101100100100 |
| 202 | 3 | −2 | 12 | 101100100101 |
| 203 | −10.5 | 0 | 12 | 101100101000 |
| 204 | 6 | −0.5 | 12 | 101100101010 |
| 205 | 5.5 | −0.5 | 12 | 101100101101 |
| 206 | 3.5 | −1 | 12 | 101100110100 |
| 207 | −4.5 | −0.5 | 12 | 101100110110 |
| 208 | 2 | 2 | 12 | 101100111001 |
| 209 | 0 | −15 | 12 | 101100111010 |
| 210 | 1 | −2.5 | 12 | 101100111100 |
| 211 | 0 | −7 | 12 | 101100111101 |
| 212 | 2.5 | 1.5 | 12 | 101100111110 |
| 213 | 0 | 9 | 12 | 101100111111 |
| 214 | 11 | 0 | 12 | 101101000101 |
| 215 | −1 | 2.5 | 12 | 101101000110 |
| 216 | −14.5 | −0.5 | 12 | 101101000111 |
| 217 | 4 | −1 | 12 | 101101010101 |
| 218 | 0.5 | −4.5 | 12 | 101101011001 |
| 219 | −9.5 | 0.5 | 12 | 101101011010 |
| 220 | 10.5 | 0 | 12 | 101101011011 |
| 221 | 5.5 | 0.5 | 12 | 101101100010 |
| 222 | 9.5 | −0.5 | 12 | 101101100011 |
| 223 | 0 | 14.5 | 12 | 101101100101 |
| 224 | 4.5 | −0.5 | 12 | 101101101000 |
| 225 | 3.5 | 1 | 12 | 101101101100 |
| 226 | 7.5 | 0 | 12 | 101101101110 |
| 227 | −0.5 | −9.5 | 12 | 101101101111 |
| 228 | −8 | 0 | 12 | 101101110011 |
| 229 | 2 | 1.5 | 12 | 101101111011 |
| 230 | −1.5 | −2.5 | 12 | 101110000110 |
| 231 | −2 | 2 | 12 | 101110000111 |
| 232 | 4 | −0.5 | 12 | 101110001011 |
| 233 | 1 | −4 | 12 | 101110001110 |
| 234 | 15 | 0 | 12 | 101110001111 |
| 235 | −0.5 | 5.5 | 12 | 101110010010 |
| 236 | −12 | 0 | 12 | 101110010011 |
| 237 | 1.5 | 2 | 12 | 101110010100 |
| 238 | 8 | 0 | 12 | 101110010111 |
| 239 | −0.5 | −4.5 | 12 | 101111000010 |
| 240 | −11 | 0 | 12 | 101111000100 |
| 241 | 0 | −16 | 12 | 101111000101 |
| 242 | 4 | 0.5 | 12 | 101111000110 |
| 243 | −14.5 | 0.5 | 12 | 101111000111 |
| 244 | −1 | −3.5 | 12 | 101111001011 |
| 245 | −0.5 | −5.5 | 12 | 101111001110 |
| 246 | 0 | −7.5 | 12 | 101111001111 |
| 247 | 7 | 0 | 12 | 101111101000 |
| 248 | 5 | −1 | 12 | 101111101100 |
| 249 | 1.5 | −2.5 | 12 | 101111101101 |
| 250 | 14 | 0 | 12 | 101111101110 |
| 251 | −3 | −2 | 12 | 101111111000 |
| 252 | −11.5 | −0.5 | 12 | 101111111001 |
| 253 | 0 | −10 | 12 | 101111111011 |
| 254 | 0 | 11.5 | 12 | 110000000110 |
| 255 | −7 | −0.5 | 12 | 110000010010 |
| 256 | −0.5 | 6.5 | 12 | 110000010011 |
| 257 | −15.5 | 15.5 | 12 | 110000100100 |
| 258 | 13.5 | 0 | 12 | 110000100101 |
| 259 | −15.5 | −0.5 | 12 | 110000101101 |
| 260 | −0.5 | 4.5 | 12 | 110000101110 |
| 261 | 5 | −0.5 | 12 | 110000101111 |
| 262 | −5 | −0.5 | 12 | 110000110101 |
| 263 | 0.5 | 5.5 | 12 | 110000110110 |
| 264 | −14 | 0 | 12 | 110000110111 |
| 265 | 0 | −11 | 12 | 110000111100 |
| 266 | 0.5 | −5.5 | 12 | 110000111110 |
| 267 | −5 | 1 | 12 | 110001000110 |
| 268 | −6 | −0.5 | 12 | 110001000111 |
| 269 | 8.5 | −0.5 | 12 | 110001011000 |
| 270 | −1.5 | 2 | 12 | 110001011001 |
| 271 | 1 | −3.5 | 12 | 110001011010 |
| 272 | −1.5 | 2.5 | 12 | 110001011111 |
| 273 | 15.5 | −0.5 | 12 | 110100100010 |
| 274 | −0.5 | −14.5 | 12 | 110100100011 |
| 275 | 14.5 | −0.5 | 12 | 110100100101 |
| 276 | −15.5 | −15.5 | 12 | 110100101010 |
| 277 | 0.5 | 6.5 | 12 | 110100101011 |
| 278 | 1 | 2.5 | 12 | 110100111000 |
| 279 | −13.5 | 0 | 12 | 110100111100 |
| 280 | −4 | −1.5 | 12 | 110100111101 |
| 281 | 15.5 | −15.5 | 12 | 110100111110 |
| 282 | 0 | −8 | 12 | 110100111111 |
| 283 | 4 | 1 | 12 | 110101000111 |
| 284 | 0 | 15.5 | 12 | 110101010000 |
| 285 | 3 | 1.5 | 12 | 110101010101 |
| 286 | −5 | 0.5 | 12 | 110101011011 |
| 287 | −5 | −1 | 12 | 110101011100 |
| 288 | 1.5 | 2.5 | 12 | 110101011101 |
| 289 | −2 | −3 | 12 | 110101110100 |
| 290 | −15.5 | 0.5 | 12 | 110101110110 |
| 291 | −3 | −1.5 | 12 | 110101110111 |
| 292 | 0 | −14 | 12 | 110101111000 |
| 293 | −8.5 | −0.5 | 12 | 110101111010 |
| 294 | −0.5 | 4 | 12 | 110101111011 |
| 295 | 9.5 | 0.5 | 12 | 111010000010 |
| 296 | 2.5 | −2 | 12 | 111010000111 |
| 297 | 14.5 | 0.5 | 12 | 111010001000 |
| 298 | −0.5 | −6 | 12 | 111010001110 |
| 299 | 0.5 | 4.5 | 12 | 111010001111 |
| 300 | −0.5 | −15.5 | 12 | 111010010000 |
| 301 | 0 | −12 | 12 | 111010010001 |
| 302 | 11.5 | −0.5 | 12 | 111010011100 |
| 303 | 10 | 0 | 12 | 111010110110 |
| 304 | −4 | −2 | 12 | 111010110111 |
| 305 | −15 | −0.5 | 12 | 111011110010 |
| 306 | −0.5 | −11.5 | 12 | 111011111010 |
| 307 | −1.5 | −3.5 | 12 | 111011111011 |
| 308 | 1.5 | 3.5 | 12 | 111100100001 |

TABLE 2-continued

XY Joint VLC Motion Vector Table for General Video

| Index | Mv_x | Mv_y | Number of bits | Code |
|---|---|---|---|---|
| 309 | 0 | 8 | 12 | 111100100101 |
| 310 | 9 | -0.5 | 12 | 111100111000 |
| 311 | -0.5 | 6 | 12 | 111110001001 |
| 312 | -0.5 | 8.5 | 12 | 111110010100 |
| 313 | -12.5 | 0 | 12 | 111110010101 |
| 314 | 2 | -3 | 12 | 111110010111 |
| 315 | 8.5 | 0.5 | 12 | 111110011100 |
| 316 | -8.5 | 0.5 | 12 | 111110011101 |
| 317 | 1.5 | -3.5 | 12 | 111110111001 |
| 318 | 0.5 | -9.5 | 12 | 111111000000 |
| 319 | -2 | 3 | 12 | 111111000001 |
| 320 | 0 | 10.5 | 12 | 111111000100 |
| 321 | -1 | 3.5 | 12 | 111111000101 |
| 322 | 0 | 7.5 | 12 | 111111001101 |
| 323 | -3.5 | -2 | 12 | 111111010110 |
| 324 | 6 | -1 | 12 | 111111010111 |
| 325 | -0.5 | 9.5 | 12 | 111111011011 |
| 326 | -1.5 | 3.5 | 12 | 111111100111 |
| 327 | 0 | 13.5 | 12 | 111111101010 |
| 328 | -0.5 | 14.5 | 12 | 111111101011 |
| 329 | -2.5 | -2.5 | 12 | 111111110000 |
| 330 | 1 | 4 | 12 | 111111110001 |
| 331 | 0.5 | -5 | 12 | 111111110010 |
| 332 | -2.5 | -2 | 12 | 111111110011 |
| 333 | -6 | 0.5 | 12 | 111111111100 |
| 334 | 0.5 | 4 | 12 | 111111111101 |
| 335 | 5 | 0.5 | 12 | 111111111110 |
| 336 | 15.5 | 0.5 | 12 | 111111111111 |
| 337 | 15.5 | 15.5 | 13 | 1001010000000 |
| 338 | -3.5 | -3.5 | 13 | 1001010000001 |
| 339 | 1 | -5 | 13 | 1001010000100 |
| 340 | 3 | 2 | 13 | 1001010000111 |
| 341 | -2 | -2.5 | 13 | 1001010001000 |
| 342 | -1 | 4 | 13 | 1001010001001 |
| 343 | 0 | -10.5 | 13 | 1001010001010 |
| 344 | -3 | 1.5 | 13 | 1001010001011 |
| 345 | -11.5 | 0.5 | 13 | 1001010001111 |
| 346 | -0.5 | -5 | 13 | 1001010010111 |
| 347 | -1 | -5 | 13 | 1001010110111 |
| 348 | 0.5 | 8.5 | 13 | 1001010111000 |
| 349 | -10 | -0.5 | 13 | 1001010111010 |
| 350 | -12 | -0.5 | 13 | 1001010111011 |
| 351 | 0.5 | -14.5 | 13 | 1001010111100 |
| 352 | 2.5 | -2.5 | 13 | 1001010111101 |
| 353 | -7 | -1 | 13 | 1010000010000 |
| 354 | -4.5 | 1.5 | 13 | 1010000010011 |
| 355 | 12.5 | 0 | 13 | 1010000010111 |
| 356 | -0.5 | 5 | 13 | 1010000011000 |
| 357 | 0.5 | -6 | 13 | 1010000011001 |
| 358 | 2.5 | 2.5 | 13 | 1010000011111 |
| 359 | 3 | 3 | 13 | 1010000100110 |
| 360 | 0 | 11 | 13 | 1010000101000 |
| 361 | 0 | -13.5 | 13 | 1010000101101 |
| 362 | -3 | -3 | 13 | 1010000101110 |
| 363 | 11.5 | 0.5 | 13 | 1010000101111 |
| 364 | -9 | -0.5 | 13 | 1010000111010 |
| 365 | -4 | 1.5 | 13 | 1010000111011 |
| 366 | 2 | 3 | 13 | 1010001000011 |
| 367 | 4 | -2 | 13 | 1010001001000 |
| 368 | -2 | -4 | 13 | 1010001001001 |
| 369 | 0 | 14 | 13 | 1010001001100 |
| 370 | 2.5 | 2 | 13 | 1010001010010 |
| 371 | -1.5 | -3 | 13 | 1010001101000 |
| 372 | 0.5 | 9.5 | 13 | 1010001101001 |
| 373 | -4.5 | -1.5 | 13 | 1010001101011 |
| 374 | 4.5 | -1 | 13 | 1010001110010 |
| 375 | 1.5 | -3 | 13 | 1010001110111 |
| 376 | -15 | -1 | 13 | 1010001111100 |
| 377 | -0.5 | -8.5 | 13 | 1010010010010 |
| 378 | -0.5 | 11.5 | 13 | 1010010010011 |
| 379 | 0.5 | -15.5 | 13 | 1010010100011 |
| 380 | -4.5 | -1 | 13 | 1010010101100 |
| 381 | 6 | 0.5 | 13 | 1010010110101 |
| 382 | 0 | 7 | 13 | 1010011000110 |
| 383 | 5 | 1 | 13 | 1010011001101 |
| 384 | 10.5 | -0.5 | 13 | 1010011010000 |
| 385 | -2.5 | 2.5 | 13 | 1010011010001 |
| 386 | -4.5 | 1 | 13 | 1010011010010 |
| 387 | 1 | 3.5 | 13 | 1010011010011 |
| 388 | 3 | -3 | 13 | 1010011010110 |
| 389 | 5.5 | -1 | 13 | 1010011011111 |
| 390 | 8 | -0.5 | 13 | 1010011101000 |
| 391 | -10.5 | -0.5 | 13 | 1010011101001 |
| 392 | 3.5 | 2.5 | 13 | 1010011101010 |
| 393 | 4.5 | -1.5 | 13 | 1010011101011 |
| 394 | 3.5 | -2 | 13 | 1011000000000 |
| 395 | -16 | -1 | 13 | 1011000000100 |
| 396 | -7.5 | -0.5 | 13 | 1011000000101 |
| 397 | -10.5 | 0.5 | 13 | 1011000000110 |
| 398 | -0.5 | -7 | 13 | 1011000000111 |
| 399 | 2 | -4 | 13 | 1011000001110 |
| 400 | -6 | -1 | 13 | 1011000001111 |
| 401 | -2.5 | 2 | 13 | 1011000010010 |
| 402 | 0.5 | 14.5 | 13 | 1011000010011 |
| 403 | -16 | -0.5 | 13 | 1011000110000 |
| 404 | -3 | 2 | 13 | 1011000110001 |
| 405 | 12 | 0 | 13 | 1011000111000 |
| 406 | -3.5 | 2.5 | 13 | 1011000111001 |
| 407 | 1.5 | 4.5 | 13 | 1011001000000 |
| 408 | 2 | -2.5 | 13 | 1011001000001 |
| 409 | 0.5 | -11.5 | 13 | 1011001001100 |
| 410 | 15 | -0.5 | 13 | 1011001001101 |
| 411 | -3.5 | -2.5 | 13 | 1011001001110 |
| 412 | -5.5 | -1 | 13 | 1011001001111 |
| 413 | -1 | 5 | 13 | 1011001010010 |
| 414 | 0 | -12.5 | 13 | 1011001010011 |
| 415 | 0.5 | 11.5 | 13 | 1011001010110 |
| 416 | 2 | 2.5 | 13 | 1011001010111 |
| 417 | -1 | -6 | 13 | 1011001011000 |
| 418 | 1.5 | 3 | 13 | 1011001011001 |
| 419 | -11 | -0.5 | 13 | 1011001100000 |
| 420 | 13 | 0 | 13 | 1011001100001 |
| 421 | -5.5 | 1.5 | 13 | 1011001100010 |
| 422 | -6 | 1 | 13 | 1011001100011 |
| 423 | -0.5 | -15 | 13 | 1011001101010 |
| 424 | -3.5 | 3.5 | 13 | 1011001101011 |
| 425 | -0.5 | -16 | 13 | 1011001101110 |
| 426 | 4.5 | 1 | 13 | 1011001101111 |
| 427 | -7.5 | 0.5 | 13 | 1011001110000 |
| 428 | -0.5 | -9 | 13 | 1011001110001 |
| 429 | -10 | -1 | 13 | 1011001110110 |
| 430 | 3 | -4 | 13 | 1011001110111 |
| 431 | 4 | -1.5 | 13 | 1011010001000 |
| 432 | -1 | -7 | 13 | 1011010001001 |
| 433 | 0.5 | 6 | 13 | 1011010101000 |
| 434 | -13 | 0 | 13 | 1011010101001 |
| 435 | 11 | -0.5 | 13 | 1011010110000 |
| 436 | 1 | -6 | 13 | 1011010110001 |
| 437 | 14 | -0.5 | 13 | 1011011000000 |
| 438 | 3.5 | 3.5 | 13 | 1011011000001 |
| 439 | -0.5 | -7.5 | 13 | 1011011000010 |
| 440 | -14.5 | -14.5 | 13 | 1011011000011 |
| 441 | -0.5 | 9 | 13 | 1011011001000 |
| 442 | -7 | 0.5 | 13 | 1011011001001 |
| 443 | 3.5 | -3.5 | 13 | 1011011001100 |
| 444 | -15.5 | -1.5 | 13 | 1011011001101 |
| 445 | -1 | -4.5 | 13 | 1011011001110 |
| 446 | -1.5 | 3 | 13 | 1011011001111 |
| 447 | -4 | 3 | 13 | 1011011010010 |
| 448 | -2 | 2.5 | 13 | 1011011010011 |
| 449 | 7.5 | -0.5 | 13 | 1011011011010 |
| 450 | 3 | -2.5 | 13 | 1011011011011 |
| 451 | -2.5 | -3.5 | 13 | 1011011100100 |
| 452 | 0.5 | 5 | 13 | 1011011100101 |
| 453 | 7 | -0.5 | 13 | 1011011100100 |
| 454 | -15 | 0.5 | 13 | 1011011110101 |
| 455 | -14 | -0.5 | 13 | 1011011111100 |
| 456 | 7.5 | 0.5 | 13 | 1011011111101 |
| 457 | 4.5 | 1.5 | 13 | 1011011111110 |
| 458 | -3 | 3 | 13 | 1011011111111 |

TABLE 2-continued

XY Joint VLC Motion Vector Table for General Video

| Index | Mv_x | Mv_y | Number of bits | Code |
|---|---|---|---|---|
| 459 | −3 | −2.5 | 13 | 1011100010000 |
| 460 | −1.5 | −4.5 | 13 | 1011100010001 |
| 461 | −5.5 | 1 | 13 | 1011100010010 |
| 462 | −4 | 2 | 13 | 1011100010011 |
| 463 | 1 | −4.5 | 13 | 1011100010100 |
| 464 | −14.5 | 14.5 | 13 | 1011100010101 |
| 465 | −2 | 4 | 13 | 1011100011000 |
| 466 | −12 | −1 | 13 | 1011100011001 |
| 467 | −0.5 | 15.5 | 13 | 1011100011010 |
| 468 | −4 | −3 | 13 | 1011100011011 |
| 469 | 2.5 | −3 | 13 | 1011100101010 |
| 470 | 14.5 | −14.5 | 13 | 1011100101011 |
| 471 | −8 | −0.5 | 13 | 1011100101100 |
| 472 | 9 | −1 | 13 | 1011100101101 |
| 473 | 0 | 10 | 13 | 1011110000000 |
| 474 | 1 | 5 | 13 | 1011110000001 |
| 475 | 1.5 | −4 | 13 | 1011110000010 |
| 476 | −0.5 | −10 | 13 | 1011110000011 |
| 477 | 0 | 15 | 13 | 1011110000110 |
| 478 | −1 | −5.5 | 13 | 1011110000111 |
| 479 | 5 | −2 | 13 | 1011110010100 |
| 480 | 1.5 | −4.5 | 13 | 1011110010101 |
| 481 | −2 | −3.5 | 13 | 1011111010010 |
| 482 | 3 | −3.5 | 13 | 1011111010011 |
| 483 | −1.5 | 4.5 | 13 | 1011111011110 |
| 484 | 3.5 | −2.5 | 13 | 1011111011111 |
| 485 | −5 | −1.5 | 13 | 1011111110100 |
| 486 | −1 | 4.5 | 13 | 1011111110101 |
| 487 | −1 | 6 | 13 | 1100000001110 |
| 488 | 13.5 | −0.5 | 13 | 1100000001111 |
| 489 | −5 | −2 | 13 | 1100000100000 |
| 490 | 9 | 0.5 | 13 | 1100000100001 |
| 491 | −11 | −1 | 13 | 1100000100010 |
| 492 | 1 | 4.5 | 13 | 1100000100011 |
| 493 | −0.5 | 10.5 | 13 | 1100000101100 |
| 494 | −5.5 | −1.5 | 13 | 1100000101101 |
| 495 | 14 | −1 | 13 | 1100000101110 |
| 496 | −9 | −1 | 13 | 1100000101111 |
| 497 | −4 | −4 | 13 | 1100001011000 |
| 498 | 2.5 | −3.5 | 13 | 1100001011001 |
| 499 | 0.5 | 10.5 | 13 | 1100001101000 |
| 500 | 2.5 | 3.5 | 13 | 1100001101001 |
| 501 | 15.5 | −1.5 | 13 | 1100001111010 |
| 502 | 5.5 | −1.5 | 13 | 1100001111011 |
| 503 | 4 | 1.5 | 13 | 1100001111110 |
| 504 | 13.5 | 0.5 | 13 | 1100001111111 |
| 505 | 5.5 | 1 | 13 | 1100010110110 |
| 506 | −3.5 | 2 | 13 | 1100010110111 |
| 507 | 3.5 | 2 | 13 | 1100010111100 |
| 508 | −1.5 | −4 | 13 | 1100010111101 |
| 509 | 10.5 | 0.5 | 13 | 1101001000000 |
| 510 | −1.5 | 4 | 13 | 1101001000001 |
| 511 | 1 | −5.5 | 13 | 1101001000010 |
| 512 | −0.5 | 13.5 | 13 | 1101001000011 |
| 513 | 0.5 | −8.5 | 13 | 1101001001000 |
| 514 | −0.5 | 11 | 13 | 1101001001001 |
| 515 | 8 | 0.5 | 13 | 1101001001100 |
| 516 | −0.5 | −12 | 13 | 1101001001101 |
| 517 | −0.5 | 8 | 13 | 1101001001110 |
| 518 | −8 | 0.5 | 13 | 1101001001111 |
| 519 | −0.5 | −10.5 | 13 | 1101001010000 |
| 520 | 10 | −0.5 | 13 | 1101001010001 |
| 521 | −15.5 | 1.5 | 13 | 1101001010010 |
| 522 | −13.5 | 0.5 | 13 | 1101001010011 |
| 523 | −9.5 | −3.5 | 13 | 1101001110010 |
| 524 | 0 | 12.5 | 13 | 1101001110011 |
| 525 | −0.5 | 7.5 | 13 | 1101001110100 |
| 526 | 14.5 | 14.5 | 13 | 1101001110101 |
| 527 | 0.5 | −7.5 | 13 | 1101001110110 |
| 528 | 0.5 | −7 | 13 | 1101001110111 |
| 529 | −0.5 | −13.5 | 13 | 1101010001100 |
| 530 | −4 | −3.5 | 13 | 1101010001101 |
| 531 | −1.5 | −15.5 | 13 | 1101010100010 |
| 532 | 1 | −7 | 13 | 1101010100011 |
| 533 | −1 | −15 | 13 | 1101010101000 |
| 534 | −1.5 | −5.5 | 13 | 1101010101001 |
| 535 | 12.5 | −15.5 | 13 | 1101010110100 |
| 536 | 5 | −1.5 | 13 | 1101010110101 |
| 537 | 8 | −1 | 13 | 1101011101010 |
| 538 | −3.5 | −3 | 13 | 1101011101011 |
| 539 | −6.5 | −1 | 13 | 1101011110010 |
| 540 | 2.5 | 3 | 13 | 1101011110011 |
| 541 | −3 | −3.5 | 13 | 1110100000000 |
| 542 | −13.5 | −0.5 | 13 | 1110100000001 |
| 543 | 0.5 | −10.5 | 13 | 1110100000010 |
| 544 | −8 | −1 | 13 | 1110100000011 |
| 545 | −3 | −4 | 13 | 1110100000110 |
| 546 | −6.5 | 3.5 | 13 | 1110100000111 |
| 547 | −16 | 0.5 | 13 | 1110100001100 |
| 548 | −1 | 5.5 | 13 | 1110100001101 |
| 549 | 15.5 | 1.5 | 13 | 1110100010010 |
| 550 | 0.5 | 13.5 | 13 | 1110100010011 |
| 551 | 3.5 | 3 | 13 | 1110100111010 |
| 552 | 2 | −3.5 | 13 | 1110100111011 |
| 553 | −2.5 | −3 | 13 | 1110101101000 |
| 554 | 3 | 2.5 | 13 | 1110101101001 |
| 555 | −16 | 1 | 13 | 1110101101010 |
| 556 | 15 | −1 | 13 | 1110101101011 |
| 557 | 4 | 2 | 13 | 1110111100000 |
| 558 | 10 | −1 | 13 | 1110111100001 |
| 559 | −2.5 | 3.5 | 13 | 1110111100010 |
| 560 | −1 | −10 | 13 | 1110111100011 |
| 561 | 0.5 | 15.5 | 13 | 1110111100110 |
| 562 | −9 | 0.5 | 13 | 1110111100111 |
| 563 | 11 | −1 | 13 | 1111001000000 |
| 564 | −3.5 | −9.5 | 13 | 1111001000001 |
| 565 | −0.5 | −11 | 13 | 1111001001000 |
| 566 | 3 | 4 | 13 | 1111001001001 |
| 567 | 7 | 0.5 | 13 | 1111001110010 |
| 568 | −10 | 0.5 | 13 | 1111001110011 |
| 569 | −3 | 2.5 | 13 | 1111100010000 |
| 570 | 7 | −1 | 13 | 1111100010001 |
| 571 | −6.5 | −15.5 | 13 | 1111100011000 |
| 572 | −3.5 | 3 | 13 | 1111100011001 |
| 573 | −2 | −5 | 13 | 1111100011010 |
| 574 | −6 | −1.5 | 13 | 1111100011011 |
| 575 | 0 | −13 | 13 | 1111100101100 |
| 576 | 1.5 | −5.5 | 13 | 1111100101101 |
| 577 | −0.5 | 14 | 13 | 1111101110000 |
| 578 | −6.5 | −3.5 | 13 | 1111101110001 |
| 579 | −15.5 | −1 | 13 | 1111110011000 |
| 580 | −12.5 | −0.5 | 13 | 1111110011001 |
| 581 | 5 | 2 | 13 | 1111110110100 |
| 582 | 1.5 | 5.5 | 13 | 1111110110101 |
| 583 | 3 | 3.5 | 13 | 1111111000100 |
| 584 | 4 | 3 | 13 | 1111111000101 |
| 585 | 13 | −0.5 | 13 | 1111111000110 |
| 586 | −5 | 1.5 | 13 | 1111111000111 |
| 587 | −1 | −6.5 | 13 | 1111111001100 |
| 588 | 0 | 13 | 13 | 1111111001101 |
| 589 | 12.5 | −0.5 | 13 | 1111111101100 |
| 590 | 15 | −15.5 | 13 | 1111111101101 |
| 591 | −0.5 | −8 | 13 | 1111111101110 |
| 592 | −14.5 | −5.5 | 13 | 1111111101111 |
| 593 | 14.5 | −5.5 | 14 | 10010100001010 |
| 594 | −11.5 | 11.5 | 14 | 10010100001011 |
| 595 | 1.5 | 4 | 14 | 10010100001100 |
| 596 | 12.5 | 15.5 | 14 | 10010100001101 |
| 597 | 3.5 | −4 | 14 | 10010100011100 |
| 598 | 0 | 12 | 14 | 10010100011101 |
| 599 | −4 | −2.5 | 14 | 10010100101100 |
| 600 | −11.5 | −11.5 | 14 | 10010100101101 |
| 601 | 2 | −6 | 14 | 10010101100000 |
| 602 | −1.5 | 15.5 | 14 | 10010101100001 |
| 603 | −16 | −2 | 14 | 10010101100010 |
| 604 | 4.5 | −2.5 | 14 | 10010101100011 |
| 605 | −15.5 | 3.5 | 14 | 10010101101100 |
| 606 | −9.5 | −1 | 14 | 10010101101101 |
| 607 | −0.5 | 7 | 14 | 10010101110010 |
| 608 | −14.5 | 4.5 | 14 | 10010101110011 |

TABLE 2-continued

XY Joint VLC Motion Vector Table for General Video

| Index | Mv_x | Mv_y | Number of bits | Code |
|---|---|---|---|---|
| 609 | 5 | −3 | 14 | 10010110110000 |
| 610 | −3.5 | −4.5 | 14 | 10010110110001 |
| 611 | 4 | −4 | 14 | 10010110110010 |
| 612 | 0.5 | −9 | 14 | 10010110110011 |
| 613 | −15 | −15 | 14 | 10100000100010 |
| 614 | 1 | 5.5 | 14 | 10100000100011 |
| 615 | −14.5 | −1 | 14 | 10100000100100 |
| 616 | −15 | −15.5 | 14 | 10100000100101 |
| 617 | 5.5 | 3.5 | 14 | 10100000101100 |
| 618 | −5.5 | −14.5 | 14 | 10100000101101 |
| 619 | −1.5 | 5.5 | 14 | 10100000111000 |
| 620 | −11 | 0.5 | 14 | 10100000111001 |
| 621 | 0.5 | −13.5 | 14 | 10100000111010 |
| 622 | −12.5 | 0.5 | 14 | 10100000111011 |
| 623 | −0.5 | −14 | 14 | 10100000111100 |
| 624 | 15 | 0.5 | 14 | 10100000111101 |
| 625 | −6 | −3 | 14 | 10100001001110 |
| 626 | 4.5 | −2 | 14 | 10100001001111 |
| 627 | −4 | 2.5 | 14 | 10100001010010 |
| 628 | −14.5 | 5.5 | 14 | 10100001010011 |
| 629 | 14.5 | 4.5 | 14 | 10100001011000 |
| 630 | 5.5 | 1.5 | 14 | 10100001011001 |
| 631 | −15 | −5 | 14 | 10100010000000 |
| 632 | 0.5 | −10 | 14 | 10100010000001 |
| 633 | −2 | −6 | 14 | 10100010000010 |
| 634 | −1 | 9 | 14 | 10100010000011 |
| 635 | 13.5 | −15.5 | 14 | 10100010000100 |
| 636 | −9.5 | −9.5 | 14 | 10100010000101 |
| 637 | −15.5 | 8.5 | 14 | 10100010001010 |
| 638 | −14 | −1 | 14 | 10100010011011 |
| 639 | 10 | 0.5 | 14 | 10100010110100 |
| 640 | 2 | −5 | 14 | 10100010110101 |
| 641 | 15.5 | −6.5 | 14 | 10100010110110 |
| 642 | 2 | 4 | 14 | 10100010110111 |
| 643 | −1 | −12 | 14 | 10100011000000 |
| 644 | 0.5 | 7.5 | 14 | 10100011000001 |
| 645 | 0.5 | −16 | 14 | 10100011000010 |
| 646 | −14.5 | 10.5 | 14 | 10100011000011 |
| 647 | 6.5 | −3.5 | 14 | 10100011000110 |
| 648 | −1.5 | 5 | 14 | 10100011000111 |
| 649 | 1 | 6 | 14 | 10100011010100 |
| 650 | −0.5 | 15 | 14 | 10100011010101 |
| 651 | 6.5 | −1 | 14 | 10100011100110 |
| 652 | 11.5 | 11.5 | 14 | 10100011100111 |
| 653 | −14.5 | −15.5 | 14 | 10100011101100 |
| 654 | 9.5 | −9.5 | 14 | 10100011101101 |
| 655 | −2 | 3.5 | 14 | 10100011111010 |
| 656 | 15.5 | −14.5 | 14 | 10100011111011 |
| 657 | 0.5 | −15 | 14 | 10100011111100 |
| 658 | 0.5 | −8 | 14 | 10100011111101 |
| 659 | 14.5 | −15.5 | 14 | 10100011111110 |
| 660 | 6 | 3 | 14 | 10100011111111 |
| 661 | −6 | −2 | 14 | 10100100100000 |
| 662 | 11 | 0.5 | 14 | 10100100100001 |
| 663 | −4.5 | 2.5 | 14 | 10100100100010 |
| 664 | 0.5 | 8 | 14 | 10100100100011 |
| 665 | −5.5 | 3.5 | 14 | 10100101000100 |
| 666 | 11.5 | −11.5 | 14 | 10100101000101 |
| 667 | 13.5 | −14.5 | 14 | 10100101001000 |
| 668 | 6.5 | −15.5 | 14 | 10100101001001 |
| 669 | −14.5 | 9.5 | 14 | 10100101001010 |
| 670 | 6.5 | 3.5 | 14 | 10100101001011 |
| 671 | 15.5 | −11.5 | 14 | 10100101011010 |
| 672 | −5 | −4 | 14 | 10100101011011 |
| 673 | 5 | 1.5 | 14 | 10100101011100 |
| 674 | 3 | −5 | 14 | 10100101011101 |
| 675 | −1 | −15.5 | 14 | 10100101011110 |
| 676 | −9.5 | 3 | 14 | 10100101011111 |
| 677 | 4.5 | 2.5 | 14 | 10100101101000 |
| 678 | −6.5 | 2.5 | 14 | 10100101101001 |
| 679 | 1.5 | −5 | 14 | 10100110001110 |
| 680 | 15.5 | −4.5 | 14 | 10100110001111 |
| 681 | −15.5 | 14.5 | 14 | 10100110010100 |
| 682 | −3.5 | −4 | 14 | 10100110010101 |
| 683 | −15 | 1 | 14 | 10100110010110 |
| 684 | 2 | 5 | 14 | 10100110010111 |
| 685 | 3.5 | 8.5 | 14 | 10100110011000 |
| 686 | −5 | 3 | 14 | 10100110011001 |
| 687 | −11.5 | −3.5 | 14 | 10100110011100 |
| 688 | −9 | −3 | 14 | 10100110011101 |
| 689 | −6 | 2 | 14 | 10100110011110 |
| 690 | 1.5 | 6.5 | 14 | 10100110011111 |
| 691 | −14.5 | −10.5 | 14 | 10100110101110 |
| 692 | 5.5 | −3.5 | 14 | 10100110101111 |
| 693 | −12.5 | −15.5 | 14 | 10100110111000 |
| 694 | −4.5 | −3.5 | 14 | 10100110111001 |
| 695 | −4.5 | −2.5 | 14 | 10100110111010 |
| 696 | −9.5 | 3.5 | 14 | 10100110111011 |
| 697 | −14.5 | 15.5 | 14 | 10100110111100 |
| 698 | 9.5 | 8.5 | 14 | 10100110111101 |
| 699 | 6.5 | 2.5 | 14 | 10100111011000 |
| 700 | −1.5 | −6.5 | 14 | 10100111011001 |
| 701 | −10 | −3 | 14 | 10100111011010 |
| 702 | −11.5 | 3.5 | 14 | 10100111011011 |
| 703 | −2.5 | 3 | 14 | 10100111100100 |
| 704 | −2 | 5 | 14 | 10100111100101 |
| 705 | −5.5 | −3.5 | 14 | 10100111100110 |
| 706 | 9.5 | 3.5 | 14 | 10100111100111 |
| 707 | 1.5 | −15.5 | 14 | 10110000000010 |
| 708 | 6 | 1 | 14 | 10110000000011 |
| 709 | Esc | Esc | 4 | 1000 |

Brief Overview of a Computer System

Figure 7:
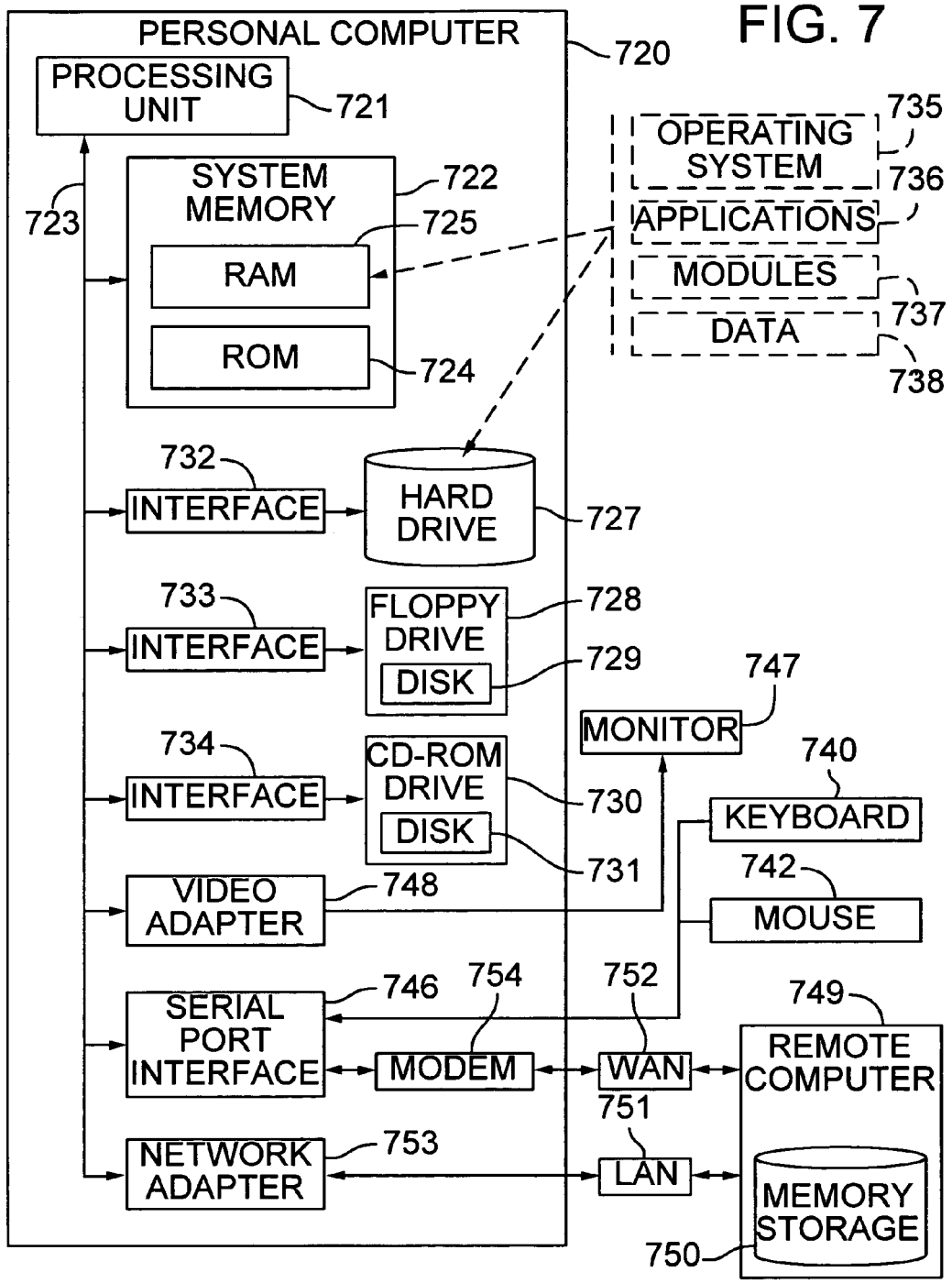
FIG. 7 is a diagram of a computer system that serves as an operating environment for a software implementation of the invention.

FIG. 7 and the following discussion are intended to provide a brief, general description of a suitable computing environment in which the invention may be implemented. Although the invention or aspects of it may be implemented in a hardware device, the encoder and decoder described above are implemented in computer-executable instructions organized in program modules. The program modules include the routines, programs, objects, components, and data structures that perform the tasks and implement the data types described above.

While FIG. 7 shows a typical configuration of a desktop computer, the invention may be implemented in other computer system configurations, including hand-held devices, multiprocessor systems, microprocessor-based or programmable consumer electronics, minicomputers, mainframe computers, and the like. The invention may also be used in distributed computing environments where tasks are performed by remote processing devices that are linked through a communications network. In a distributed computing environment, program modules may be located in both local and remote memory storage devices.

FIG. 7 illustrates an example of a computer system that serves as an operating environment for the invention. The computer system includes a personal computer 720, including a processing unit 721, a system memory 722, and a system bus 723 that interconnects various system components including the system memory to the processing unit 721. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 724 and random access memory (RAM) 725. A basic input/output system 726 (BIOS), containing the basic routines that help to transfer information between elements within the personal computer 720, such as during start-up, is stored in ROM 724. The personal computer 720 further includes a hard disk drive 727, a magnetic disk drive 728, e.g., to read from or write to a removable disk 729, and an optical disk drive 730, e.g., for reading a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions (program code such as dynamic link libraries, and executable files), etc. for the personal computer 720. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 725, including an operating system 735, one or more application programs 736, other program modules 737, and program data 738. A user may enter commands and information into the personal computer 720 through a keyboard 740 and pointing device, such as a mouse 742. Other input devices (not shown) may include a microphone, joystick, game pad, satellite dish, scanner, or the like. These and other input devices are often connected to the processing unit 721 through a serial port interface 746 that is coupled to the system bus, but may be connected by other interfaces, such as a parallel port, game port or a universal serial bus (USB). A monitor 747 or other type of display device is also connected to the system bus 723 via an interface, such as a display controller or video adapter 748. In addition to the monitor, personal computers typically include other peripheral output devices (not shown), such as speakers and printers.

The personal computer 720 may operate in a networked environment using logical connections to one or more remote computers, such as a remote computer 749. The remote computer 749 may be a server, a router, a peer device or other common network node, and typically includes many or all of the elements described relative to the personal computer 720, although only a memory storage device 750 has been illustrated in FIG. 7. The logical connections depicted in FIG. 7 include a local area network (LAN) 751 and a wide area network (WAN) 752. Such networking environments are commonplace in offices, enterprise-wide computer networks, intranets and the Internet.

When used in a LAN networking environment, the personal computer 720 is connected to the local network 751 through a network interface or adapter 753. When used in a WAN networking environment, the personal computer 720 typically includes a modem 754 or other means for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. The network connections shown are merely examples and other means of establishing a communications link between the computers may be used.

CONCLUSION

While the invention has been illustrated using a specific implementation as an example, the scope of the invention is not limited to the specific implementation described above. Spatial prediction effectively exploits the spatial dependency of motion vectors and improves the efficiency of jointly coding motion vectors with a single entropy code. However, the specific form of prediction used on the motion vectors is not critical to the invention. In fact, it is possible to implement the invention without using a prediction scheme.

The implementation described above specifically uses a Huffman coding scheme to compute entropy codes for a joint motion vector parameter. As noted, it is also possible to use other forms of entropy coding to encode the joint parameter with a single entropy code.

In view of the many possible implementations of the invention, it should be recognized that the implementation described above is only examples of the invention and should not be taken as a limitation on the scope of the invention. Rather, the scope of the invention is defined by the following claims. We therefore claim as our invention all that comes within the scope and spirit of these claims.

We claim:

1. In a video coder for coding video images in a block format, a method for improving compression of the video images comprising:
   predicting x and y motion vector components for a current block of pixels based on a motion vector of at least one neighboring block of pixels to compute x and y components of a predictor motion vector;
   computing differential x and y components from the x and y components of the predictor and x and y components of a motion vector for the current block; and
   assigning a single variable length code to joint x and y differential motion vector components, wherein the single variable length code is assigned from a variable length code table, the table comprising a list of pairs of joint differential motion vector components and a corresponding variable length code for each pair, such that shorter variable length codes are assigned to joint differential motion vector components that have a higher probability of occurrence in the video images, and longer variable length codes are assigned to joint differential motion vector components that have a lower probability of occurrence, wherein the table includes the most probable pairs of joint differential motion vector components as computed by statistical analysis of example video sequences.

2. The method of claim 1 wherein the assigning includes:
   looking up the joint differential motion vector components in the table;
   when no match is found in the table, coding an escape code along with a fixed length code for each differential motion vector component.

3. The method of claim 1 wherein the block of pixels corresponds to a macroblock in a video frame divided into fixed-sized, rectangular macroblocks, and the predicting, computing, and assigning are repeated for the macroblocks in the video frame.

4. The method of claim 1 wherein the block of pixels corresponds to a macroblock of a video object plane in a video frame having two more video object planes, and the video object planes are each divided into fixed-sized, rectangular macroblocks; and
   the predicting, computing and assigning are repeated for the macroblocks in the video object planes.

5. A computer readable medium having instructions for performing the method of claim 1.

6. In a video decoder, a method for decoding macroblocks of a predicted video frame comprising:

receiving a single variable length code representing joint x and y components of a motion vector for each of the macroblocks;

for each of the macroblocks, searching for a single entry in an entropy codebook corresponding to the variable length code and including the x and y components of the motion vector, wherein training determines which x and y components to include in the entropy codebook; and using the x and y components of the motion vector from the codebook to define motion of pixels in a corresponding macroblock.

7. The method of claim 6 wherein the x and y components of the motion vector in the codebook comprise x and y differential motion vector components, and the method comprises:

reconstructing the motion vector from the differential motion vector components and x and y components of a predictor motion vector.

8. The method of claim 6 wherein the codebook is a Huffman table trained for a target bit rate and content type from a statistical analysis of example video sequences having the content type.

9. A computer readable medium having instructions for performing the method of claim 6.

10. A motion vector encoder comprising:

a motion vector predictor for computing a motion vector predictor for a motion vector of a block of pixels from at least one motion vector for a neighboring block of pixels;

a subtractor for computing differential motion vector components from motion vector components of the predictor and the motion vector of the block of pixels; and a joint entropy coder for jointly coding the differential motion vector components with a single variable length code, wherein statistical analysis indicates which differential motion vector components to represent with variable length codes and which differential motion vector components to represent with an escape code followed by fixed length codes.

11. The encoder of claim 10 wherein the joint entropy coder computes the single variable length code by searching for the code in a Huffman coding table comprising a list of joint differential motion vectors and a corresponding variable length code for each of the joint differential motion vectors.

12. A motion vector decoder comprising:

a motion vector predictor for computing a motion vector predictor for a motion vector of a block of pixels from at least one motion vector for a neighboring block of pixels;

a joint entropy decoder for decoding a single variable length code into joint differential motion vector components, wherein the joint entropy decoder decodes the single variable length code by searching for the code in a Huffman coding table comprising a list of variable length codes and corresponding joint differential motion vector components for each of the variable length codes, wherein training determines which joint differential motion vector components to include in the table and which joint differential motion vector components to exclude from the table; and an adder for reconstructing X and Y motion vector components from the joint differential motion vector components and X and Y components of the motion vector predictor.

13. The decoder of claim 12 wherein the joint entropy decoder is operable to detect an escape code indicating that two fixed length codes representing X and Y differential motion vector components follow the escape code.

14. In a video coder for coding video images in a block format, a method for improving compression of the video images comprising:

computing x and y motion vector components for a block;

forming the x and y motion vector components into a joint parameter representing joint x and y motion vector components; and assigning a single variable length code to the joint x and y motion vector components, the single variable length code selected from a set of available variable length codes, such that shorter variable length codes are assigned to joint motion vector components that have a higher probability of occurrence in the video images, and longer variable length codes are assigned to joint differential motion vector components that have a lower probability of occurrence, wherein training determines which joint x and y motion vector components to represent in the set of available variable length codes.

15. The method of claim 14 further including spatially predicting the x and y motion vector components from a neighboring block of the block; and using spatially predicted components as the joint x and y motion vector components.

16. The method of claim 15 wherein the spatially predicted components are differential motion vector components computed as a difference between x and y components of the motion vector for the block and x and y components of a predictor motion vector.

17. In a video decoder, a method for decoding macroblocks of a predicted video frame comprising:

receiving a single variable length code representing joint differential x and y components of a motion vector for each of the macroblocks;

for each of the macroblocks, searching for a single entry in a Huffman table corresponding to the variable length code and including the joint differential x and y components of the motion vector, wherein the Huffman table includes variable length codes for the most probable joint differential x and y components as computed by statistical analysis of example video sequences;

computing x and y components of a predictor motion vector from neighboring macroblocks to the macroblock currently being decoded; and reconstructing the motion vector from the differential components obtained from the Huffman table and the x and y components of the predictor motion vector.

18. In a video coder for coding video images in a block format, a method for variable length coding block motion information of the video images, wherein a joint parameter represents x and y motion vector components for a block, the method comprising:

assigning a single variable length code selected from a set of available variable length codes to the joint x and y motion vector components, wherein training determines which joint x and y motion vector components to represent in the set of available variable length codes.

19. The method of claim 18 wherein the block is a 16×16 macroblock of pixels, and wherein each of the x and y motion vector components comprises a differential value.

20. A video decoder including computer-executable instructions for causing a computer programmed thereby to perform a method for variable length decoding macroblock motion information of a predicted video frame, wherein a single variable length code represents joint differential x and y components of a motion vector for each of plural macroblocks, the method comprising:

for each of the plural macroblocks, searching for a single entry in a Huffman table corresponding to the variable length code for the macroblock, wherein the single entry includes the joint differential x and y components of the motion vector for the macroblock, wherein the joint differential x and y components are combinable with predictor x and y components to reconstruct the motion vector for the macroblock, and wherein the Huffman table includes variable length codes for the most probable joint differential x and y components as computed by statistical analysis of example video sequences.

* * * * *

UNITED STATES PATENT AND TRADEMARK OFFICE
CERTIFICATE OF CORRECTION

| | |
|---|---|
| PATENT NO. | : 6,983,018 B1 |
| APPLICATION NO. | : 09/201278 |
| DATED | : January 3, 2006 |
| INVENTOR(S) | : Lin et al. |

Page 1 of 1

It is certified that error appears in the above-identified patent and that said Letters Patent is hereby corrected as shown below:

In column 2, line 37, delete "MN" and insert -- $M_N$ --, therefor.

In column 2, line 42, delete "MN" and insert -- $M_N$ --, therefor.

In column 2, line 45, delete "MN" and insert -- $M_N$ --, therefor.

In column 5, line 24, after "stream" insert -- 30 --.

Signed and Sealed this

Twenty-fifth Day of August, 2009

David J. Kappos
*Director of the United States Patent and Trademark Office*